United States Patent
Lanham et al.

(10) Patent No.: US 6,904,667 B2
(45) Date of Patent: *Jun. 14, 2005

(54) APPARATUS FOR AND A METHOD FOR FABRICATING A CORIOLIS FLOWMETER FORMED PRIMARILY OF PLASTIC

(75) Inventors: Gregory Treat Lanham, Longmont, CO (US); Anthony Pankratz, Golden, CO (US)

(73) Assignee: Micro Motion, Inc., Boulder, CO (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/156,984

(22) Filed: May 29, 2002

(65) Prior Publication Data

US 2002/0139199 A1 Oct. 3, 2002

Related U.S. Application Data

(62) Division of application No. 09/516,861, filed on Mar. 2, 2000, now Pat. No. 6,450,042.

(51) Int. Cl.⁷ .................................................. G01R 3/00
(52) U.S. Cl. .............................. 29/595; 29/593; 29/595; 29/890.14; 29/DIG. 4; 29/DIG. 48; 73/7; 73/861.354; 73/861.357; 228/131
(58) Field of Search ..................... 29/593, 595, 890.14, 29/DIG. 4, DIG. 48; 73/7, 861.354, 861.357; 228/131

(56) References Cited

U.S. PATENT DOCUMENTS

| | | |
|---|---|---|
| 4,444,059 A | 4/1984 | Smith |
| 4,628,744 A | 12/1986 | Lew |
| 4,860,594 A | 8/1989 | Hammond et al. |
| 4,949,583 A | 8/1990 | Lang et al. |
| 5,027,662 A | 7/1991 | Titlow et al. |
| 5,133,226 A | 7/1992 | Muller |
| 5,157,975 A | 10/1992 | Tanaka et al. |
| 5,448,921 A | 9/1995 | Cage et al. |
| 5,476,013 A | 12/1995 | Hussain et al. |
| 5,700,957 A | 12/1997 | Alesz et al. |
| 5,814,739 A | 9/1998 | Van Cleve |
| 5,918,285 A | 6/1999 | Van der Pol |

FOREIGN PATENT DOCUMENTS

JP     5026709     2/1993

*Primary Examiner*—Paul D Kim
(74) *Attorney, Agent, or Firm*—Duft Setter Ollila & Bornsen LLC

(57) ABSTRACT

An injection molding process for fabricating a Coriolis flowmeter. The process includes the steps forming a material flow path core using a core mold, placing the formed material flow path core into a wrapper mold having a cavity whose surfaces define the exterior surface of the plastic Coriolis flowmeter structure to be formed, injecting low temperature metal or soluble material into the cavity of the wrapper mold, removing the plastic Coriolis flowmeter structure from the wrapper mold, and removing the material flow path core from the plastic Coriolis flowmeter by melting the low temperature metal core or by dissolving the soluble material using hot water.

10 Claims, 12 Drawing Sheets

APPARATUS FOR AND A METHOD FOR FABRICATING A CORIOLIS FLOWMETER FORMED PRIMARILY OF PLASTIC

CROSS REFERENCE TO A RELATED APPLICATION

This application is a divisional of U.S. patent application Ser. No. 09/516,861 titled "Apparatus for and a Method of Fabricating a Coriolis Flowmeter Formed Primarily of Plastic" and filed on Mar. 2, 2000, now U.S. Pat. No. 6,450,042. The referenced application is hereby incorporated by reference as if the referenced application were included in this application.

FIELD OF THE INVENTION

This invention relates to apparatus for and a method of fabricating a Coriolis flowmeter and more particularly a Coriolis flowmeter formed primarily of plastic.

PROBLEM

Coriolis flowmeters are in widespread use in applications that require the generation of accurate information regarding material flow. This information includes mass flow rate and material density. Coriolis flowmeters range in size from meters having a flow tube 0.16 centimeters in diameter to those 15 centimeters in diameter. These flowmeters serve wide range of material flows ranging from approximately several drops per minute, such as for use in anesthesiology systems, to several tons a minute, such as for use in oil pipelines or the loading and unloading of oil tankers. Regardless of its size, most of the applications in which Coriolis flowmeters are used require the highest degree of accuracy such as, for example, a maximum error of 0.15 percent. Also, many of the applications in which Coriolis flowmeters are used involve the generation of flow information for material that is hazardous and for which great care must be taken to prevent material leaks into the environment.

It is a problem that these stringent requirements have heretofore resulted in a high cost of manufacture of Coriolis flowmeters. This high cost of manufacture results from the expensive materials that must be used, such as stainless steel and titanium. This high cost of manufacture also results from the complexities of the manufacturing processes currently used to produce high quality Coriolis flowmeters meeting the above discussed requirements. These steps include extensive machining, welding, brazing, and assembly of parts. Another requirement is that flow tubes of curved flow tube meters must have a constant curvature and be free from kinks. These requirements increase the complexity of the machining and bending operations required to fabricate the flow tube.

Another problem is with the brazing operations used to join the various flowmeter elements. Braze joints are typically used to affix the flow tube to the brace bar. Braze joints are also used to join other parts such as driver and pick off brackets and to affix a manifold to the ends of U shaped flow tubes. Considerable care must be taken in the brazing operations to produce braze joints that securely affixes elements to one another and that are free from microscopic cracks. Also, the brazing operation generates thermal stresses in which a brace bar can cool faster than the flow tube or the other elements to which the brace bar is connected. This rapid and uneven cooling generates a permanent stress in the elements to which the brace bar is connected.

Another problem is that Coriolis flowmeters are not devices that are produced in volumes on an assembly line. They are low production quantity devices which are handcrafted and carefully inspected at each stage of the manufacturing process to ensure that each part meets its design specifications and is of the required accuracy before it is joined to another part. This high degree of care is required to ensure that the completed flowmeter meets its design specifications and is free from defects which could impair its output accuracy or cause its failure.

Another problem of Coriolis flowmeters is that they are often required to process corrosive materials. This degrades the life expectancy and reliability of the flowmeters unless they are fabricated using exotic materials such as stainless steel or titanium. These materials are expensive to purchase and are difficult to fabricate. The use of these materials often results in a flowmeter having elements formed of dissimilar materials; such as a flowmeter that has some stainless steel elements that must be joined to a titanium flow tube to provide an all titanium material flow path that is highly resistant to corrosive process materials.

Another problem of Coriolis flowmeters is that metal flow tubes of an acceptable thickness are relatively stiff and resistant to bending. The thicker the flow tube wall—the stiffer the flow tube. This stiffness opposes the Coriolis forces generated by the material flow and reduces the Coriolis deflections of the vibrating flow tube with material flow. This, in turn, reduces the flowmeter sensitivity by reducing the phase difference of the output signals generated by the flow tube pick offs. This is a particular problem in Coriolis flowmeters which must use flow tubes having thick walls for the containment of high pressure materials. Thus, the use of any metal flow tube is a compromise between the wall thickness required by pressure containment requirements and the flow sensitivity required of the flowmeter. U.S. Pat. No. 5,157,975 discloses a Coriolis flowmeter having a glass flow tube. However, it is brittle and does not solve the above mentioned problems of Coriolis flowmeters having metal flow tubes.

SOLUTION

In accordance with the present invention a Coriolis flowmeter is provided that achieves an advance in the art and solves the above problems including the problem of high material costs and difficulty of manufacturing. The flowmeter of the present invention solves these problems by the use of plastic for most of the elements embodying the flowmeter. The flowmeter of the invention solves the above problems using manufacturing techniques which permit many embodiments of the invention to be formed by injection molding. All embodiments of the invention make extensive use of plastic and injection molding. In particular, all embodiments have a dynamically active structure that is formed entirely of plastic by injection molding.

In accordance with a first possible exemplary embodiment, a Coriolis flowmeter is provided having a single straight flow tube, a surrounding plastic balance bar concentric with the flow tube and a plastic brace bar that connects the ends of the balance bar with the flow tube. The entirety of the dynamically active structure (the flow tube, the balance bar and the brace bar) is formed of plastic by injection molding. The flow tube ends may be subsequently coupled to end flanges by appropriate bonding techniques.

In accordance with a second possible embodiment of the invention, the elements of the dynamically active structure as well as the end flanges are formed of plastic by injection molding. This second embodiment provides a plastic wetted flow path that extends through the entirety of the length of the flowmeter with the material flow extending serially from an inlet flange, through the flow tube to an outlet flange. This embodiment is advantageous in that the plastic wetted flow path eliminates problems of corrosion resulting from an interaction between the process material and metal flowmeter elements such as titanium, stainless steel and other metals. With the possible exception of a driver and pick offs, and case, the entirety of the flowmeter is formed of plastic by injection molding.

The above embodiment is formed by an injection molding process that comprises a first step of forming a flow path core mold having a cavity that defines the physical characteristics of the flow path within the flowmeter. The cavity within the flow path core mold is filled with a metal compound of fusible alloys containing bismuth, lead, tin, cadmium and indium. These alloys have a low melting point of approximately 47° Centigrade. The injected metal is then allowed to cool to its solid state at which time the split halves of the mold are separated and the formed metal is removed. This metal defines, with precision, the material flow path of the flowmeter.

The second step of the process involves forming a wrapper mold having a cavity that defines the exterior of the flowmeter elements be formed. The formed low temperature metal flow path core is inserted into the wrapper mold which is then injected with the plastic that is used to form the exterior of the flowmeter elements. The plastic in the wrapper mold is allowed to cool and solidify following which the split halves of the wrapper mold are separated and the formed plastic flowmeter element is removed. The exterior of the formed plastic defines the desired external characteristics of the flowmeter element. The metal flow path core defining the flow path remains contained with the plastic structure formed by the wrapper molding process. This plastic structure defining the flow path is then heated to the temperature required to melt the low temperature metal flow path core. The low temperature metal melts and flows out of the plastic flowmeter element so that the resulting structure is a flowmeter element having exterior physical characteristics defined by the void within the wrapper mold and having an inner flow path defined by the flow path metal core formed by the flow path core mold.

The plastic flow elements formed by the above process are advantageous in that their external physical characteristics are formed with precision by the void within the wrapper mold. The flow element has an interior flow path formed with precision by the low temperature metal flow path core formed by the core mold. This process provides an idealized flow path having walls that are free from the defects and irregularities typical of the current casting processes associated with the fabrication of metal flow manifolds.

Another embodiment of the invention provides a Coriolis meter having a single curved flow tube formed of plastic. This flowmeter can be fabricated by an injection molding process similar to that above described for single straight tube flowmeters.

Another embodiment of the invention provides a Coriolis flowmeter having a pair of straight tubes connected between an inlet flange and an outlet flange. The pair of flow tubes comprises a dynamically balanced structure formed of plastic which may be fabricated by injection molding in a manner similar to that above described.

Another embodiment of the invention provides a Coriolis flowmeter having a pair of curved flow tubes comprising a dynamically balanced structure and connected between an inlet flange and an outlet flange. This flowmeter may be formed of plastic and fabricated in an manner similar to that above described.

In accordance with another embodiment of the invention, all of the above described flowmeters have brace bars formed of plastic and fabricated by plastic injection molding so as to comprise an integral unit with associated flow tubes.

In accordance with another embodiment of the invention, a single straight tube flowmeter includes an associated balance bar for dynamic balance. The balance bar may either be concentric with and surround its associated flow tube or, alternatively, may be a separate member parallel to and spaced apart from its associated flow tube but coupled to the flow tube by means of an associated brace bar.

All of the above described alternatives provide a Coriolis flowmeter that makes extensive use of plastic for its parts. Some of the embodiments use plastic only for the flow tube or tubes; others use plastic for the entirety of the dynamic structure comprising the flow tube or tubes, balance bar, and brace bar. Other embodiments employ plastic for the end flanges so that the Coriolis flowmeter provides a wetted material flow path entirely of plastic. The plastic part or parts of the flowmeters are formed by injection molding so that the part or parts of the flowmeter that employ plastic comprise a single integral plastic element.

The flowmeters of the present invention minimize corrosion problems by the use of plastic materials. These flowmeters are easier to manufacture and therefore have lower costs because of the use of plastic injection molding techniques. These flowmeters avoid the prior art problems of nonuniform wall thickness. These Coriolis flowmeters are further advantageous since the employment of the plastic injection molding provides a flow tube having a controlled wall thickness. If desired, the side wall of the flow tube bar may have an axial change in thickness in order to accomplish modal tuning. Also, auxiliary elements such as side ribs may be placed on the flow tube or the balance bar to control lateral vibration. The flow tube and the balance bar and the brace bar comprise an integral structure. This integral structure may also include flanges or alternatively the flanges may be affixed at a later time by means of adhesive bonding or plastic solvent welding. The case, if provided, may be either metal or plastic and if plastic may be permanently affixed to the remainder of the plastic elements of the flowmeter to provide a single integral unit formed primarily of plastic except for necessary metal elements such as the electrical conductors needed to operate the flowmeter. Also, a plastic junction box may be glued to the plastic flowmeter after inserting wires through it.

The molds are machined with precision to form flow paths having ideal bends with well controlled inner diameter and outer diameter measurements. Out of round problems of the flow tube flow path are avoided. Also avoided are the non smooth, rough or irregular inner walls of the flow tube. Corrosion problems are minimized by the use of plastic. Also avoided are the failure of brazed and welded joints typical of metal flowmeters together with the avoidance of the thermal problems associated with welding and brazing operations. Also, the meter has a low weight and is easily disposed of at the end of its useful life by recycling the plastic. The plastic flow tubes are more flexible than are metal flow tubes of the same thickness. This increases flowmeter sensitivity by enabling the plastic flow tube to have a greater Coriolis response for a given flow rate.

An aspect of the invention is:

A Coriolis flowmeter comprising:

flow tube means adapted to receive a material flow from a flowmeter input and to extend said material flow through said flow tube means to a flowmeter outlet;

a driver for vibrating said flow tube means;

pick off means coupled to said flow tube means for generating output signals representing Coriolis deflections of said vibrating flow tube means with material flow;

means responsive to said output signals generated by said pick offs for generating output information pertaining to said material flow; and characterized by the flow tube means is formed of plastic to define a plastic wetted material flow path that extends through the entirety of the length of said flow tube means.

Another aspect is that the Coriolis flowmeter includes an inlet flange and an outlet flange coupled to ends of said flow tube means to define said flowmeter inlet and said flowmeter outlet.

Another aspect is that the Coriolis flowmeter is characterized in that said inlet flange and said outlet flange are formed of plastic.

Another aspect is that the Coriolis flowmeter is characterized in that said plastic wetted material flow path further includes said inlet flange and said outlet flange with said material flow extending serially through said inlet flange and said flow tube means and said outlet flange.

Another aspect is that the Coriolis flowmeter is characterized in that said wetted material flow path includes plastic flow tube stubs that connect said flow tube means to said inlet flange and to said outlet flange.

Another aspect is that the Coriolis flowmeter further includes a case enclosing said flow tube means and said driver and said pick off means.

Another aspect is that the Coriolis flowmeter is characterized in that said case is formed of plastic.

Another aspect is that the Coriolis flowmeter is characterized in that said flow tube means comprises a single flow tube.

Another aspect is that the Coriolis flowmeter further comprises:

a balance bar oriented parallel to said flow tube; and brace bar means coupling said flow tube to end portions of said balance bar.

Another aspect is that the Coriolis flowmeter is characterized in that said balance bar is formed of plastic.

Another aspect is that the Coriolis flowmeter is characterized in that said balance bar and said brace bar means are formed of plastic.

Another aspect is that the Coriolis flowmeter is characterized in that:

said brace bar means comprises first and second brace bars coupling ends of said balance bar to said flow tube; and a wall surface of said flow tube contains corrugations in a portion of said flow tube between said brace bars.

Another aspect is that the Coriolis flowmeter is characterized in that:

said plastic wetted flow path further includes a plastic inlet flange and a plastic outlet flange coupled to ends of said flow tube; and that said balance bar and said brace bar means are formed of plastic.

Another aspect is that the Coriolis flowmeter is characterized in that said balance bar and said brace bar means and said flow tube are enclosed within a case to define an integral Coriolis flowmeter structure formed of plastic.

Another aspect is that the Coriolis flowmeter is characterized in that:

said balance bar and said brace bar means and said flow tube are enclosed within a case to define an integral Coriolis flowmeter structure formed of plastic;

a plastic case connect link means couples an inner wall of said case to ends of said balance bar and to said flow tube and to said brace bar means.

Another aspect is that the Coriolis flowmeter further includes plastic links positioned intermediate said flange means and said case connect link means and coupling said inner wall of said case to said flow tube.

Another aspect is that the Coriolis flowmeter is characterized in that said balance bar contains surface elements formed of plastic for facilitating the mounting of said driver and said pick off means to said balance bar.

Another aspect is that the Coriolis flowmeter is characterized in that said driver has a plastic bobbin integral with said balance bar and further has an electrically conductive coil on said bobbin.

Another aspect is that the Coriolis flowmeter is characterized in that said pick off means has a plastic bobbin integral with said balance bar and further has an electrically conductive coil on said bobbin.

Another aspect is that the Coriolis flowmeter is characterized in that said balance bar encloses said flow tube.

Another aspect is that the Coriolis flowmeter is characterized in that said balance bar is parallel to said flow tube and has a longitudinal axis offset from the longitudinal axis of said flow tube.

Another aspect is that the Coriolis flowmeter is characterized in that said flow tube means comprises a first flow tube and a second flow tube and that said Coriolis flowmeter further comprises:

brace bar means having a first end connected to said first flow tube and a second end connected to said second flow tube.

Another aspect is that the Coriolis flowmeter is characterized in that brace bar means are plastic.

Another aspect is that the Coriolis flowmeter is characterized in that said wetted flow path includes a plastic inlet flange and a plastic outlet flange each coupled to ends of said first flow tube and of said second flow tube.

Another aspect is that the Coriolis flowmeter is characterized in that said brace bar and said first flow tube and said second flow tube are enclosed within a plastic case.

Another aspect is that the Coriolis flowmeter is characterized in that said wetted flow path includes a plastic splitter manifold coupling said inlet flange to inlet portions of said first and second flow tubes and further includes a plastic combiner manifold coupling said outlet flange to outlet portions of said first and second flow tubes.

Another aspect is that the Coriolis flowmeter is characterized in that said first flow tube and said second flow tube are curved.

Another aspect is that the Coriolis flowmeter is characterized in that said wetted flow path includes:

a plastic inlet flange coupled to inlet ends of said first and second flow tubes; and a plastic outlet flange coupled to outlet ends of said first and second flow tubes.

Another aspect is that the Coriolis flowmeter is characterized in that said wetted flow path further comprises:

a plastic inlet manifold connecting said inlet flange to said inlet ends of said first and second flow tubes;

a plastic outlet manifold connecting said outlet flange to said outlet ends of said first and second flow tubes.

Another aspect is that the Coriolis flowmeter is characterized in that said brace bar and said first and second flow tubes and each of said manifolds are enclosed within a plastic case.

Another aspect is the Coriolis flowmeter further comprises:

a plastic case, plastic coupling means that couples said case to said plastic flow tube means;

said flow tube means is plastic and positioned within said case and adapted to receive a material flow;

said driver vibrates said plastic flow tube means;

said pick off means is coupled to said plastic flow tube means for generating output signals representing Coriolis defections of said vibrating plastic flow tube means with material flow;

said output signals are applied to circuitry that generates information pertaining to said material flow.

Another aspect is that the Coriolis flowmeter is characterized in that said driver has a plastic bobbin coupled to said flow tube means; and said pick off means having a plastic bobbin coupled to said flow tube means.

Another aspect is a method of fabricating structure of a Coriolis flowmeter including flow tube means; said method comprising the steps of:

forming a core defining a material flow path of said flow tube means by injecting a low melting point metal or soluble material into a cavity of a core mold with said cavity defining said material flow path;

placing said formed material flow path core into a cavity of a wrapper mold and closing said wrapper mold to form a cavity between the outer surface of said formed material flow path core and the interior surface of said cavity of said wrapper mold;

said cavity of said wrapper mold defines the outer surface of said flow tube means;

filling said cavity of said wrapper mold with plastic to form a molded plastic flow tube means that contains said formed material flow path core;

removing said molded plastic flow tube means containing said formed material flow path core from said wrapper mold; and removing said formed material flow path core from said molded plastic flow tube means by raising the temperature of said molded plastic flow tube means above the melting point of said metal forming said material flow path core or by dissolving said molded formed material flow path core with a solvent.

Another aspect is that the method is characterized in that said cavity further has means that locates said formed material flow path core in said cavity of said wrapper mold;

Another aspect is that the method further includes the step of forming said core mold having said cavity that defines said material flow path of said flow tube means.

Another aspect is that the method further includes the step of forming a wrapper mold having a cavity that defines said outer surface of said flow tube means and further having said means that locates said formed material flow path core in said cavity of said wrapper mold.

Another aspect is that the method is characterized in that said flow tube means defines a pair of flow tubes;

the step of forming said core mold includes the step of forming said core mold so that said cavity of said core mold defines the material flow paths of said pair of flow tubes;

the step of forming said material flow path core includes the step of forming said material flow path core of said pair of flow tubes;

the step of filing said cavity of said wrapper mold with plastic includes the step of forming a molded plastic structure defining said pair of flow tubes each containing one of said material flow path cores.

Another aspect is that the method is characterized in that said fabricated Coriolis flowmeter structure further comprises:

a first brace bar coupling a first end of each of said pair of flow tubes to each other and a second brace bar coupling a second end of each of said flow tubes to each other;

characterized in that said step of forming a wrapper mold includes the step of forming a cavity in said wrapper mold that defines the outer surface of said fabricated Coriolis flowmeter structure including said first and second brace bars and said pair of flow tubes;

the step of filing said cavity of said wrapper mold with plastic includes the step of forming a plastic Coriolis flowmeter structure defining said pair of flow tubes and said brace bars and with said formed Coriolis flowmeter structure containing said formed material flow path core.

Another aspect is that the method is characterized in that said fabricated Coriolis flowmeter structure further comprises:

driver mounting elements and pick off mounting elements affixed to said first and second flow tubes;

said step of forming said wrapper mold includes the step of forming a cavity in said wrapper mold that defines the outer surface of said fabricated Coriolis flowmeter structure including said driver mounting elements and said pick off mounting elements;

characterized in that said wrapper mold has provisions for locating said formed core in said cavity of said wrapper mold;

characterized in that the step of filing said cavity of said wrapper mold with plastic includes the step of forming a molded plastic Coriolis flowmeter structure that contains said pair of flow tubes, said driver mounting element and said pick off mounting elements with said pair of flow tubes containing said formed material flow paths core.

Another aspect is that the method is characterized in that said fabricated flowmeter structure further comprises:

an inlet flange coupled to an inlet end of said flow tubes and an outlet flange coupled to an outlet end of said flow tubes;

characterized in that said step of forming a wrapper mold includes the step of forming having a cavity that defines the outer surface of said Coriolis flowmeter structure including said flow tubes, said first brace bar and said second brace bar, said inlet flange and said outlet flange;

the step of filing said cavity of said wrapper mold with plastic includes the step of forming a molded plastic Coriolis flowmeter structure that that defines the exterior surface of said flow tubes, said first and second brace bars and said inlet flange and said outlet flange with said plastic Coriolis flowmeter structure containing said formed material flow path core.

Another aspect is that the method is characterized in that said fabricated flowmeter structure further comprises:

an inlet manifold coupling said inlet flange to an inlet end of said flow tubes and an outlet manifold coupling said outlet flange to an outlet end of said flow tubes;

said step of forming a wrapper mold includes the step of forming having a cavity that defines the outer surface of said Coriolis flowmeter structure including said flow tubes, said first brace bar and said second brace bar, said inlet manifold and said outlet manifold, said inlet flange and said outlet flange;

the step of filing said cavity of said wrapper mold with plastic includes the step of forming a molded plastic Coriolis flowmeter structure that that defines the exterior surface of said flow tubes, said first and second brace bars and said inlet manifold and said outlet manifold, said inlet flange and said outlet flange with said plastic Coriolis flowmeter structure containing said formed flow path core.

Another aspect is that the method is characterized in that said fabricated Coriolis flowmeter structure comprises a flow tube and a concentric balance bar surrounding said flow tube;

the step of forming a core mold includes the steps of forming a first core mold having a cavity that defines the material flow path of said flow tube;

said step of forming a core mold further includes the step of forming a second core mold having a cavity that defines the space between the exterior surface of said flow tube and the interior surface of said balance bar;

the step of forming a core includes the steps of injecting low temperature metal or soluble material into said first core mold to form said material flow path core and further includes the step of injecting low temperature metal or soluble material into said second core mold to form a hollow balance bar core that defines said space between the exterior surface of said flow tube and said interior surface of said balance bar;

the step of forming said wrapper mold includes the steps of forming a cavity adapted to receive said formed material flow path core and said formed hollow balance bar core;

the step of placing includes the steps of placing said formed material flow path core into said wrapper mold cavity and placing said formed hollow balance bar core into said wrapper mold cavity so that said formed hollow balance bar core is concentric with said material flow path core;

the step of filling includes the step of filing said cavity of said wrapper mold with plastic to form a molded plastic Coriolis flowmeter structure that defines the outer surface of said flow tube and said concentric balance bar with said plastic Coriolis flowmeter structure containing said material flow path core and said hollow balance bar core.

Another aspect is that the method is characterized in that said fabricated Coriolis flowmeter structure further comprises:

a first brace bar coupling a first end of said balance bar to said flow tube and a second brace bar coupling second end of said balance bar to said flow tube;

said step of forming a wrapper mold includes the step of forming having a cavity in said wrapper mold that defines the outer surface of said Coriolis flowmeter structure including said flow tube and said balance bar as well as said first brace bar and said second brace bar;

the step of filing said cavity of said wrapper mold with plastic includes the step of forming a molded plastic Coriolis flowmeter structure that defines said flow tube and said concentric balance bar as well as said first and second brace bars and that contains said material flow path core and said hollow balance bar core.

Another aspect is that the method is characterized in that said fabricated flowmeter structure further comprises:

an inlet flange coupled to an inlet end of said flow tube and an outlet flange coupled to an outlet end of said flow tube;

characterized in that said step of forming a wrapper mold includes the step of forming having a cavity that defines the outer surface of said Coriolis flowmeter structure including said flow tube, said balance bar, said first brace bar and said second brace bar, said inlet flange and said outlet flange;

the step of filing said cavity of said wrapper mold with plastic includes the step of forming a molded plastic Coriolis flowmeter structure that that defines the exterior surface of said flow tube, said balance bar, said first and second brace bars and said inlet flange and said outlet flange with said plastic Coriolis flowmeter structure containing said formed flow path core and said hollow balance bar core.

Another aspect is that the method is characterized in that said fabricated Coriolis flowmeter structure further comprises:

driver mounting elements and pick off mounting elements affixed to said balance bar;

the step of forming said wrapper mold includes the step of forming a cavity in said wrapper mold that defines the outer surface of said Coriolis flowmeter structure including said flow tube, said balance bar, said brace bars, said inlet manifold and said outlet manifold, and said driver mounting elements and pick off mounting elements;

the step of filing said cavity of said wrapper mold with plastic includes the step of forming a molded plastic Coriolis flowmeter structure whose outer surface defines said flow tube, said balance bar, said brace bars, said driver mounting elements and pick off mounting elements on said balance bar, said inlet manifold and said outlet manifold and with said plastic Coriolis flowmeter structure containing said formed material flow path core and said hollow balance bar core.

DESCRIPTION OF THE DRAWINGS

The invention may be better understood by a reading of the following detailed description thereof taken in conjunction with the drawings in which.

DETAILED DESCRIPTION

Figure 1:
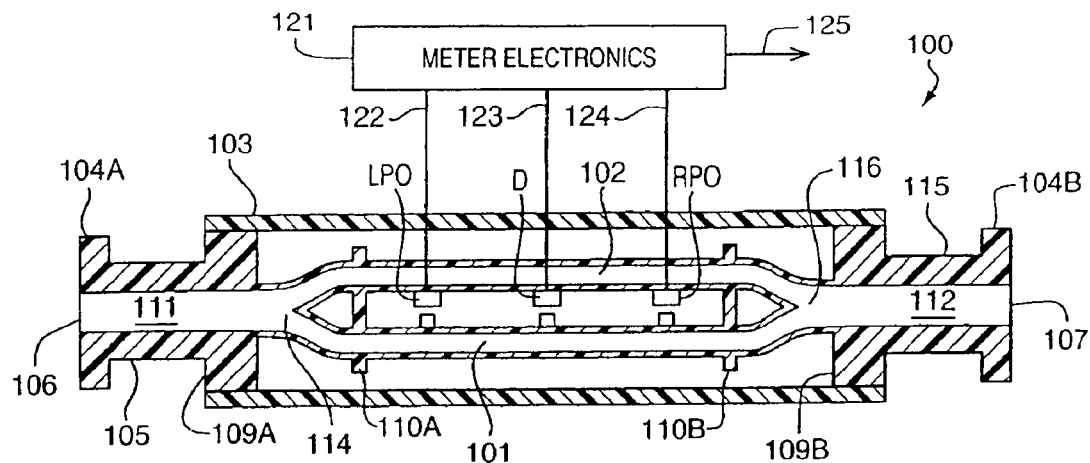
FIG. 1 discloses a Coriolis flowmeter having a pair of straight flow tubes.

Description of FIG. 1

FIG. 1 discloses a section view of Coriolis flowmeter 100 having a pair of flow tubes 101 and 102 enclosed within a case 103. A material flow enters the flowmeter at inlet 106 of flange 104A and extends through flow channel 111 of neck 105 and case end 109A to diverter 114 which splits the material flow into two halves which are extended through flow tubes 101 and 102. Flow tubes 101 and 102 extend through brace bars 110A and 110B. Material flow exits the flow tubes at combiner 116 and extends through case end 109B and flow channel 112 of neck 115 and outlet 107 of flange 104B. Necks 105 and 115 couple flanges 104A and 104B to ends 109A and 109B of case 103. The end portions of the flow tubes are coupled to each other by brace bars 110A and 110B.

A magnet and coil of driver D is coupled to flow tubes 101 and 102 to vibrate them transversely to their longitudinal axis in phase opposition. Driver D is energized by signals received from meter electronics 121 over path 123. The material flow through the vibrating flow tubes generate Coriolis forces which are detected by left pick off LPO and right pick off RPO which generate signals indicative of the magnitude of the Coriolis forces. The output signals of the pick offs are extended over paths 122 and 124 to meter electronics 121 which processes these signals and applies output information over path 125 indicative of the material flow.

In accordance with a first possible exemplary embodiment of the invention, flow tubes 101 and 102 as well as necks 105 and 115 may be formed of plastic by a injection molding process to provide a wetted flow path through the entirety of the flowmeter between inlet 106 and outlet 107.

As a another possible embodiment, flow tubes 101 and 102 as well as brace bars 110A and 110B, case ends 109A and 109B and flanges 104A and 104B may be formed of plastic by a molding process. A plastic case 103 may be affixed by adhesive bonding to case ends 109A and 109B to provide a flowmeter that is made up entirely of plastic except for the metal conductors within the coils of driver D and pick offs LPO and RPO along with their associated magnets.

The case may be fabricated independently of the remainder of flowmeter 100 and subsequently affixed to the case ends by adhesive bonding. The case may be formed of either metal or plastic.

Figure 2:
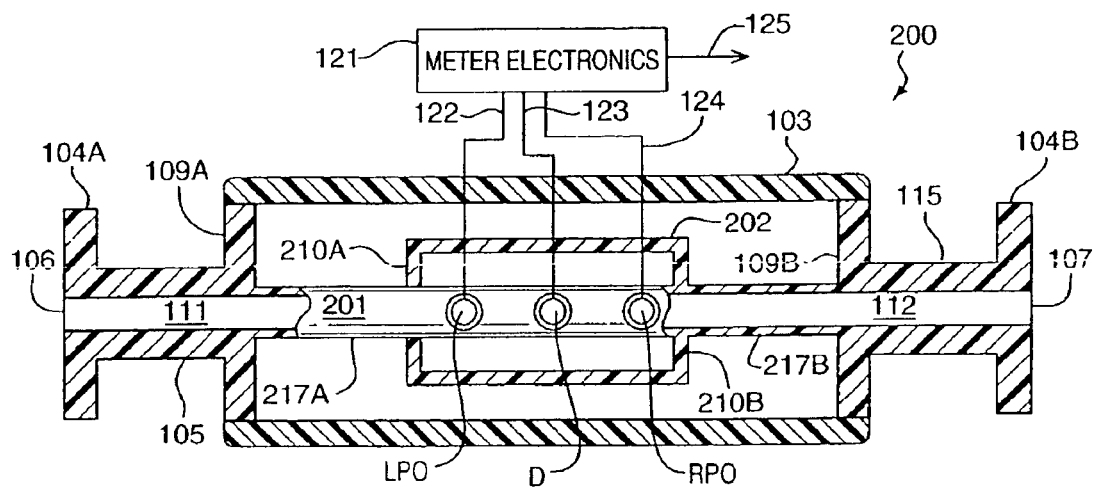
FIG. 2 discloses a Coriolis flowmeter having a single straight flow tube.

Description of FIG. 2

FIG. 2 discloses a sectioned Coriolis flowmeter 200 having a single flow tube 201 coupled by brace bars 210A and 210B to cylindrical balance bar 202 which is concentric with the longitudinal center of flow tube 201. The material flow is from inlet 106 of flange 104A, through flow channel 111 of neck 105, through flow tube stub 217A to brace bar 210A, through flow tube 201, through flow tube stub 217B to brace bar 210B, through flow channel 112 of neck 115 to outlet 107 of flange 104B.

The portion of flow tube 201 enclosed by balance bar 202 is defined as the dynamically active portion of the flow tube. This portion is vibrated by driver D to generate Coriolis forces which are detected by pick offs LPO and RPO which apply signal over conductors 122 and 124 to meter electronics 121 in the same manner as described in connection with FIG. 1. Meter electronics applies signals over conductor 122 to driver D to vibrate flow tube 201 and balance bar 202 in phase opposition.

All or part of the structure shown on FIG. 2 may be formed of plastic by a molding process. If desired, only flow tube 201 and balance bar 202 may be formed of plastic. The remainder of the structure of FIG. 2 could then be metal. Alternatively, flanges 104A and 104B could be additionally formed of plastic. Alternatively, the case ends 109A and 109B and case 103 could be formed of metal or plastic independently and affixed by adhesion after the remainder of the flowmeter is formed and calibrated.

Figure 3:
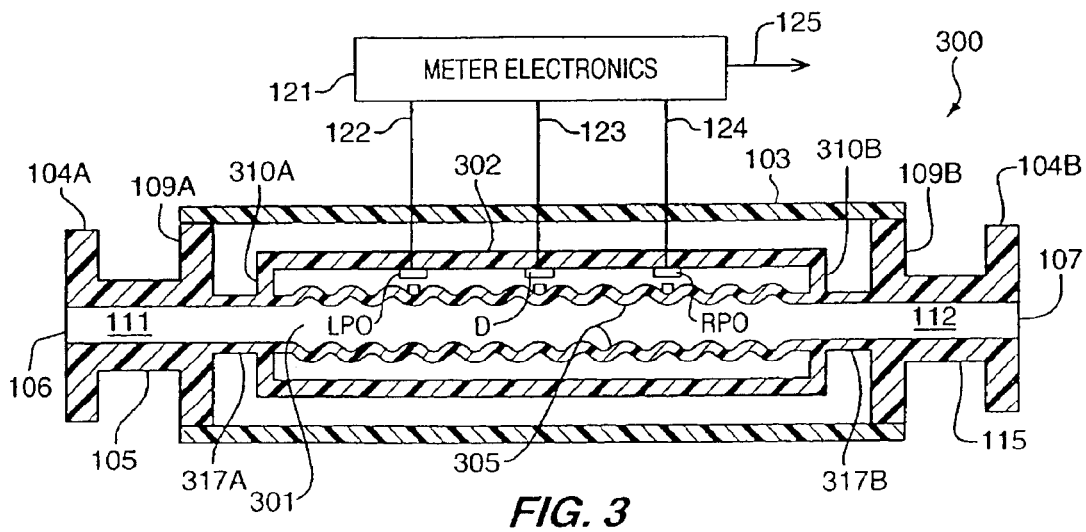
FIG. 3 discloses a Coriolis flowmeter having a single straight flow tube with corrugations in the dynamically active portion of the flow tube.

Description of FIG. 3

FIG. 3 discloses a sectioned Coriolis flowmeter 300 which is similar to the Coriolis flowmeter of FIG. 2 in that it has single flow tube 301 coupled by brace bars 310A and 310B to balance bar 302 which is concentric with flow tube 301. Material flow extends through the flowmeter 300 from inlet 106 of flange 104A, flow channel 111 of neck 105, through case end 109A, through stub 317A and the active portion of flow tube 301 between brace bars 310A and 310B, through stub 317B and case end 109B, through flow channel 112 of neck 115 to outlet 107 of flange 104B.

The flowmeter 300 differs from flowmeter 200 only in that the dynamically active portion of flow tube 301 intermediate brace bars 310A and 310B has corrugations 305 which alter the vibrational characteristics of the flow tube as described in detail in U.S. Pat. No. 5,814,739. The entirety of the Coriolis flowmeter 300 is made of plastic by the use of a molding process as priorly described. This, of course, excludes the metallic conductors of coils of left pick off LPO, right pick off RPO, driver D, and their associated magnets.

If desired, the case 103 may be fabricated independently and affixed to the remainder of the elements of the flowmeter by means of adhesive bonding. Also if desired, the case may be formed of metal. However, the dynamically active portion of the flowmeter including the entirety of flow tube 101 advantageously will be plastic formed by a molding operation.

Figure 4:
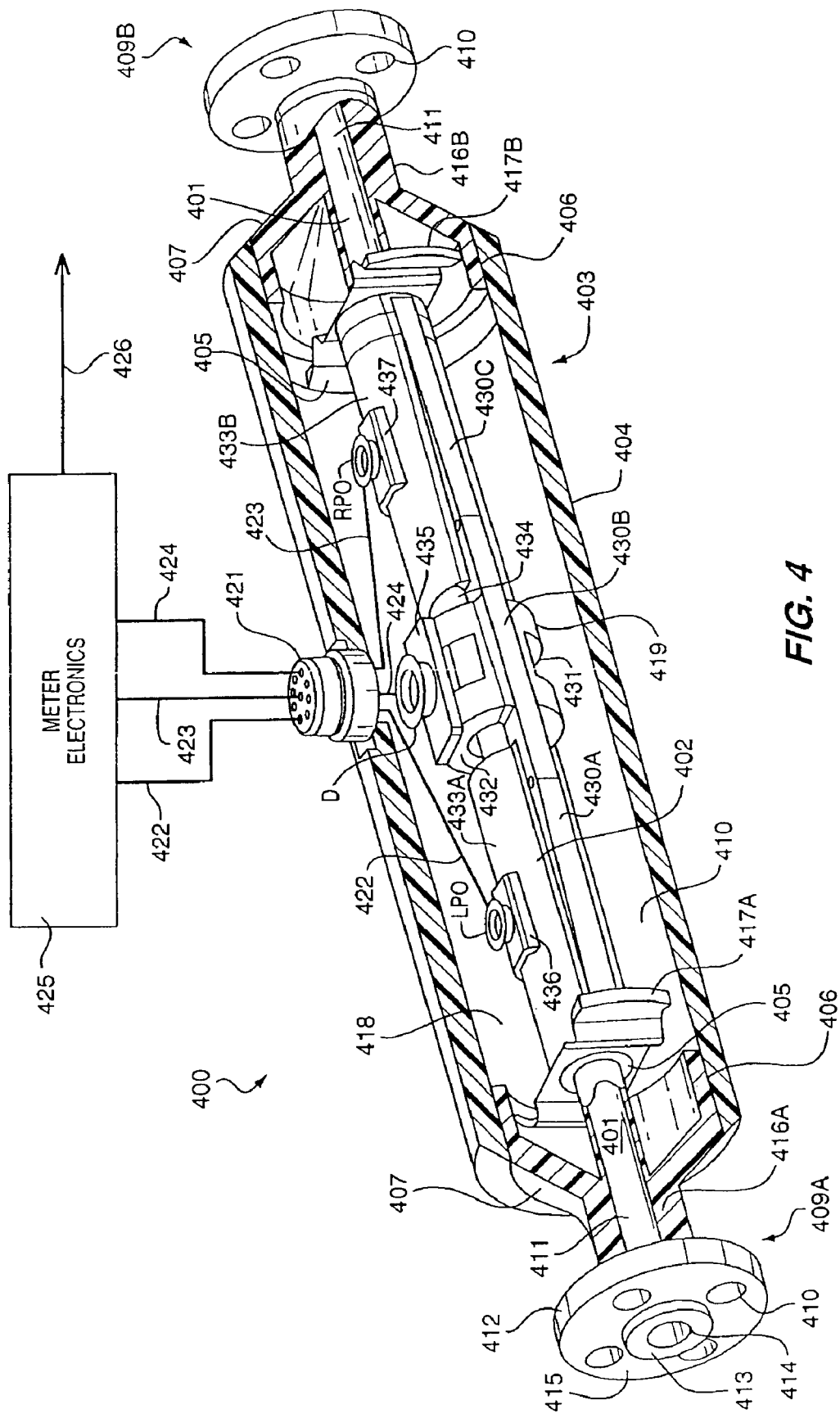
FIG. 4 discloses a Coriolis flowmeter having a single straight flow tube surrounded by a concentric balance bar and a case enclosing the flow tube and the balance bar.

Description of FIG. 4

FIG. 4 discloses a sectioned Coriolis flowmeter 400 having a single straight flow tube 401 surrounded by a concentric balance bar 402 having non-uniform weight and stiffness distribution. Balance bar 402 is connected at its ends by brace bars 405 to flow tube 401. Brace bars 405 are connected by case connect links 417A and 417B to the inner wall of case end 407. The ends of flow tube 401 are connected via flow channels 411 to inlet flange 409A and to outlet flange 409B. Each flange 409A and 409B includes bolt holes 410 for connection to a supply and exit lines. Each flange further includes radial surface 412 and circular protrusion 413 surrounding inlet 414 and affixed to the flange end surface 415. Case 403 is connected to case ends 407 which are connected to neck elements 416A and 416B which are coupled to flanges 409A and 409B at their terminus.

Balance bar 402 has non-uniformed stiffness and weight distribution. It comprises a plurality of distinct side ribs 430 which enhance the vibrational characteristics of the flowmeter. One of the objectives of this design is to concentrate the vibrational node of the balance bar/flow tube structure proximate brace bars 405. Side ribs include side ribs 430A, 430B, and 430C. These function to inhibit undesirable lateral vibrations of the balance bar. The end portions of balance bar 402 include relatively thick segments 433A and 433B. The inner center terminus of each of these relatively thick sections terminates in voids 432 and 434. The voids are separated by center element 419 which has center void 431. Voids 432 and 434 provide maximum flexibility of the balance bar at its center portion. The top center portion of center element 419 is coupled to flat element 435 which mounts a top portion of driver D. Driver D receives signals over conductor 424 from meter electronics 425. The top surfaces of segments 433A and 433B are connected to flat elements 436 and 437 which mount pick offs LPO and RPO.

Pick offs LPO and RPO detect the Coriolis response of flow tube 401 as it vibrates during conditions of material flow. The output signals of the pick offs are extended over conductors 422 and 423 and through feed through 421 to meter electronics 425 which processes the signals and applies output information to path 426 regarding the material flow.

The entirety of flowmeter 400, with the exception of the conductors of driver D and picks LPO and RPO and their magnets may be formed of plastic. The case may advantageously be formed independently and affixed by case ends 407 to the remainder of the flowmeter elements. The case may be either formed of metal or plastic. Pick offs LPO, RPO, and driver D are advantageously affixed to balance bar 402 and flow tube 401 subsequent to the fabrication of these elements by molding. Conductors 422, 423, and 424 are extended through openings in feed through 421 after the feed through is affixed to an opening in case 403.

Figure 5:
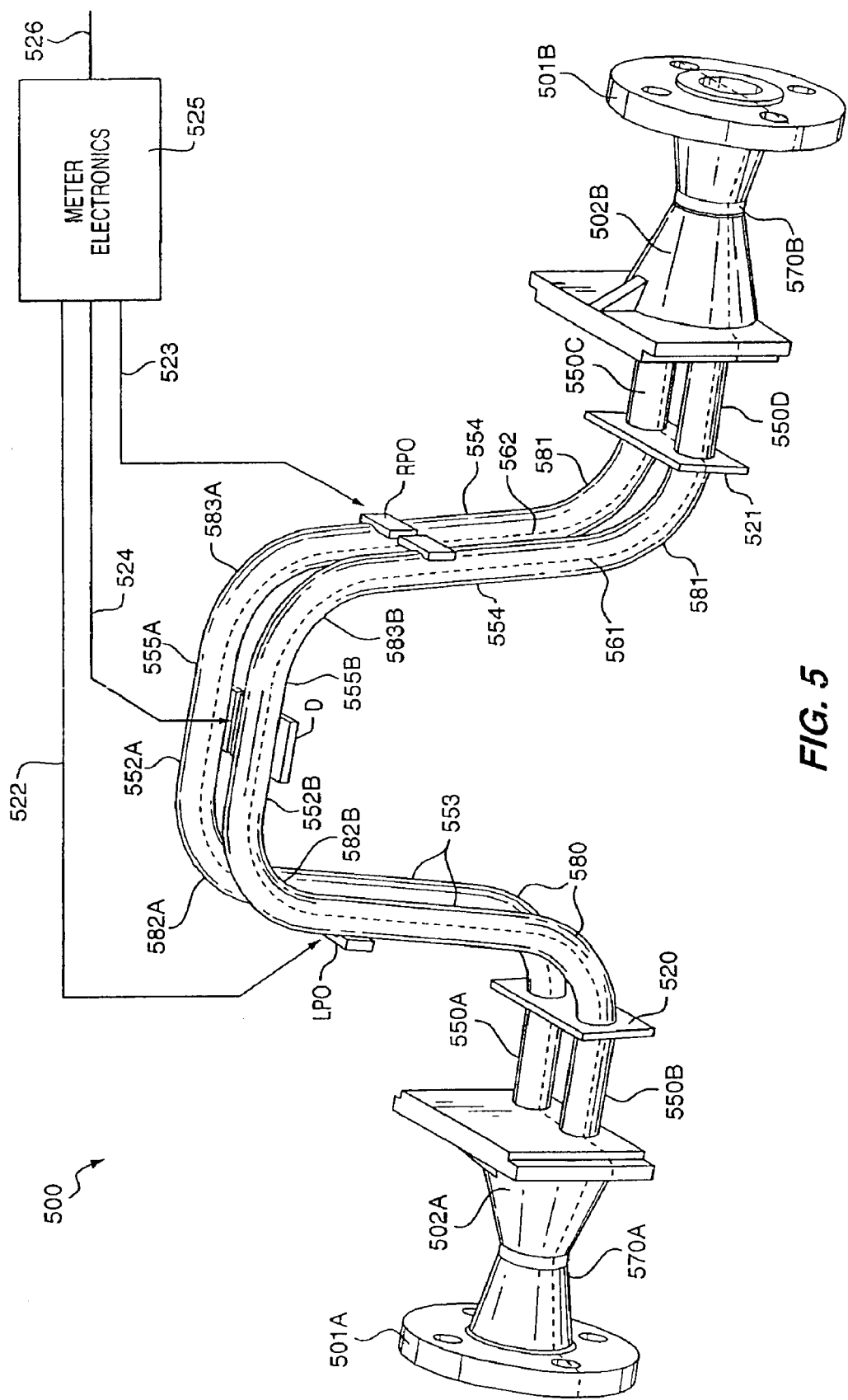
FIGS. 5 and 6 disclose Coriolis flowmeters having a pair of substantially U-shaped flow tubes.

Description of FIG. 5

FIG. 5 discloses a Coriolis flowmeter 500 having a pair of substantially U-shaped flow tubes 552A and 552B which extend through brace bars 520 and 521 and terminate in manifolds 502A and 502B. Manifolds 502A is connected by neck 570A inlet flange 501A; manifold 502B is connected by neck 570B to outlet flange 501B. Flow tubes 552A and 552B have a plurality of segments. Top segments 555A and 555B extend into curve segments 582A and 582B and curved segments 583A and 583B. The flow tubes further comprise side segments 553 and 554 which on their bottom portions extend into curved sections 580 and 581 which, in turn, extend through brace bars 520 and 521. The flow tubes further extend through the brace bars to flow channels 550A and 550B and 550C and 550D and terminate in manifolds 502A and 502B.

Driver D is coupled to top segments of flow tubes 552A and 552B to vibrate them in phase opposition in response to signals received over path 524 from meter electronics 525. Side segments 553 and 554 are coupled to pick offs LPO and RPO which generate signals representing the Coriolis response of the vibrating flow tubes with material flow. These signals are extended over paths 522 and 523 to meter electronics 525 which processes signals and applies output information to path 526 pertaining the material flow.

The entire meter 500 with the exception of the coils of pick offs LPO and RPO and driver D may be formed of plastic by a molding process with the mold parting line shown by dotted lines 561 and 562. Flanges 501A and 501B may be either be formed in the same process or alternatively may be formed independently and coupled by plastic adhesion to necks 570A and 570B.

The Coriolis flowmeter elements of FIG. 5 may be enclosed within a case (not shown) for the physical protection of the elements of FIG. 5.

Figure 6:
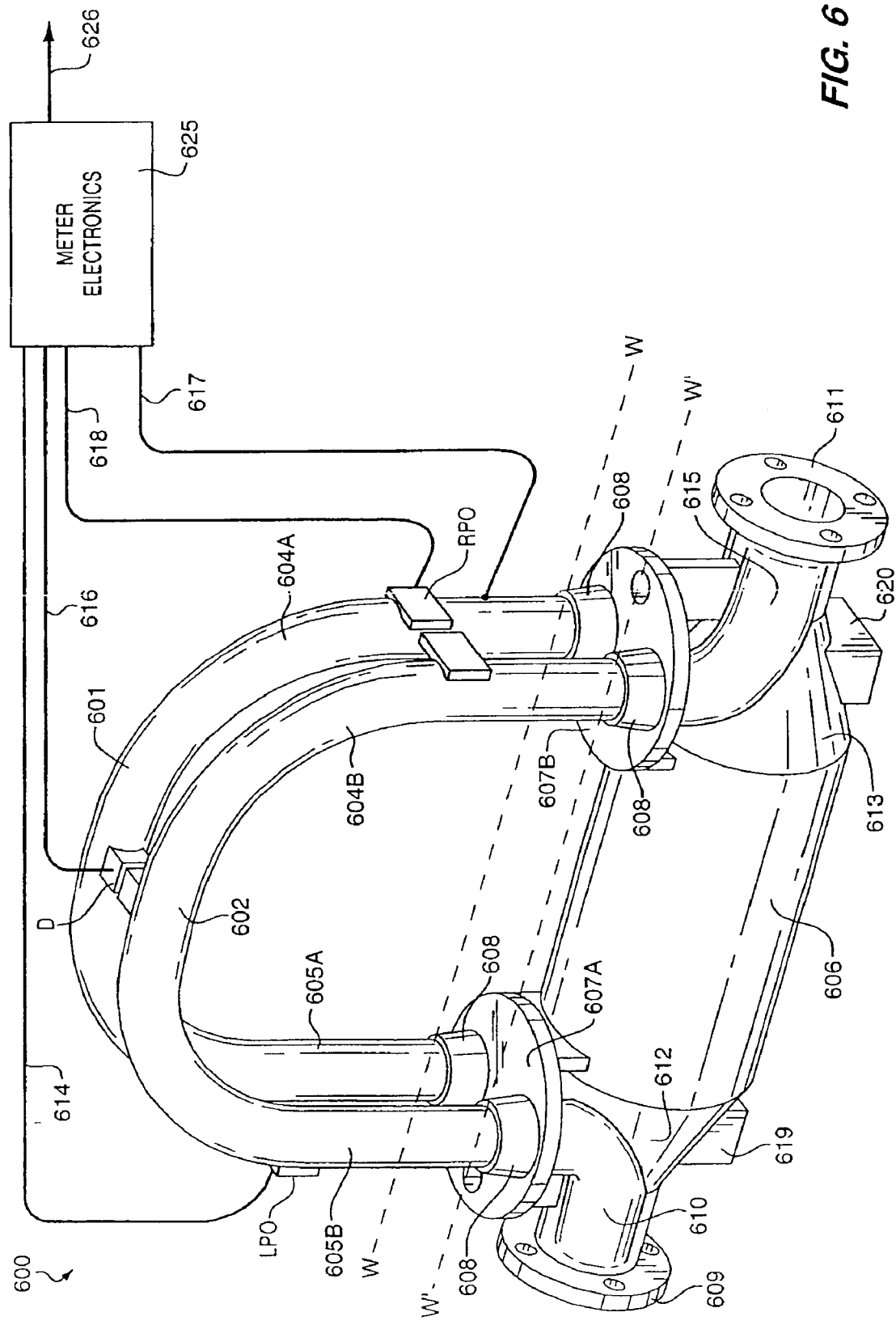

Description of FIG. 6

FIG. 6 discloses another possible exemplary embodiment of the invention comprising a Coriolis flowmeter 600 having a pair of substantially U-shaped flow tubes 601 and 602, manifolds 610 and 615, spacers 606, 612, and 613, input flange 609 and output flange 611. The top portion of the flow tubes is connected to driver D which vibrates the flow tubes in phase opposition. The side legs 604A, 604B, 605A, and 605B of the flow tubes are coupled to pick offs LPO and RPO which generates output signals representing the Coriolis response of the vibrating flow tube with material flow. The output signals of the pick offs are applied over conductors 614 and 618 to meter electronics 625 which process the information and applies output signals to path 626 pertaining to the material flow. The lower extremity of side leg 605A and 605B are connected to manifold extensions 608 to couple the side legs to manifolds 610 and 615.

Input flange 609 is connected to manifold 610 which receives the input material flow and divides it into two sections which are extended to a lower legs 605A and 605B of the flow tubes. On the output side, manifold 615 receives the output flow of side legs 604A and 604B and recombines them into a single flow which is applied via output flange 611 to a material destination (not shown).

Coriolis flowmeter 600 may be fabricated by molding as subsequently described by a process which includes the steps of forming a core mold which extends through the flanges 609 and 611, and manifolds 610 and 615. The process further includes using the core molds in combination with a wrapper mold to form the Coriolis flowmeter 600 to comprise an all plastic flowmeter with the exception of the metallic conductors associated with driver D and pick offs LPO and RPO. Alternatively and if desired, the flow tubes may be molded separately and adhesive bonded to the sockets of manifolds 610 and 615.

Description of Plastic Injection Molding Process of Coriolis Flowmeters

Figure 7:
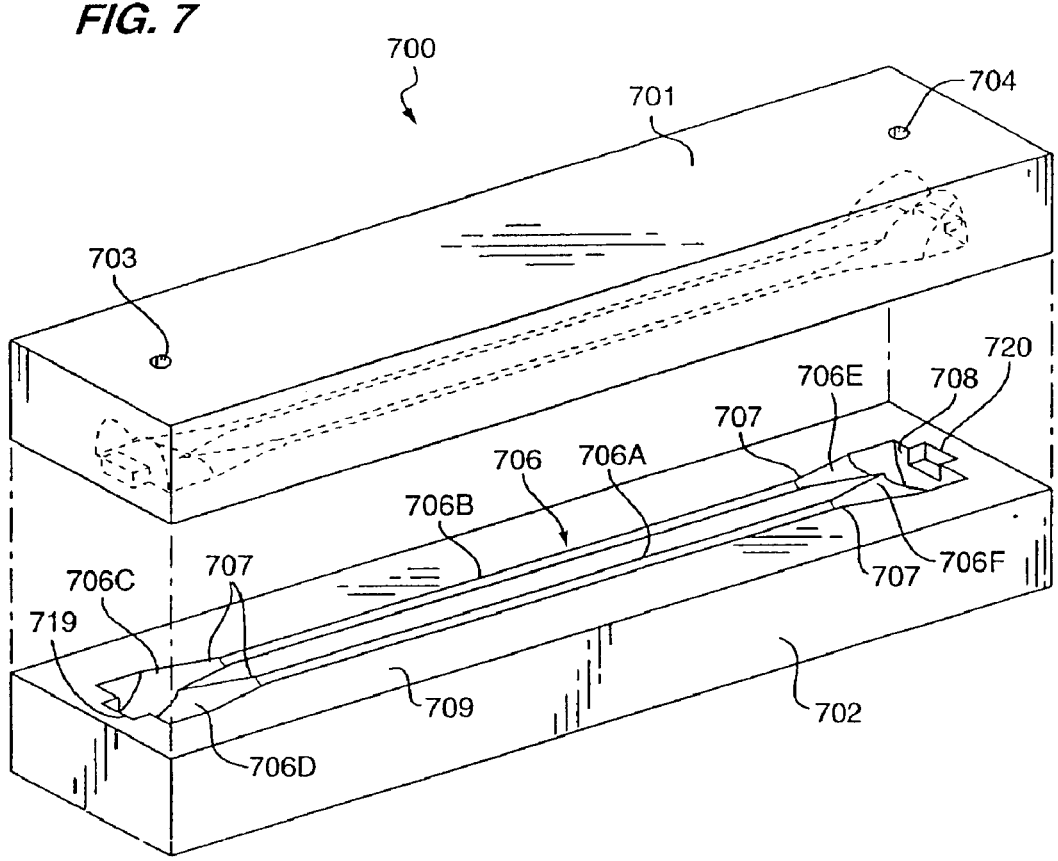
FIG. 7 discloses a core mold used to form the core of a flow path, of a dual straight tube flowmeter.
Figure 8:
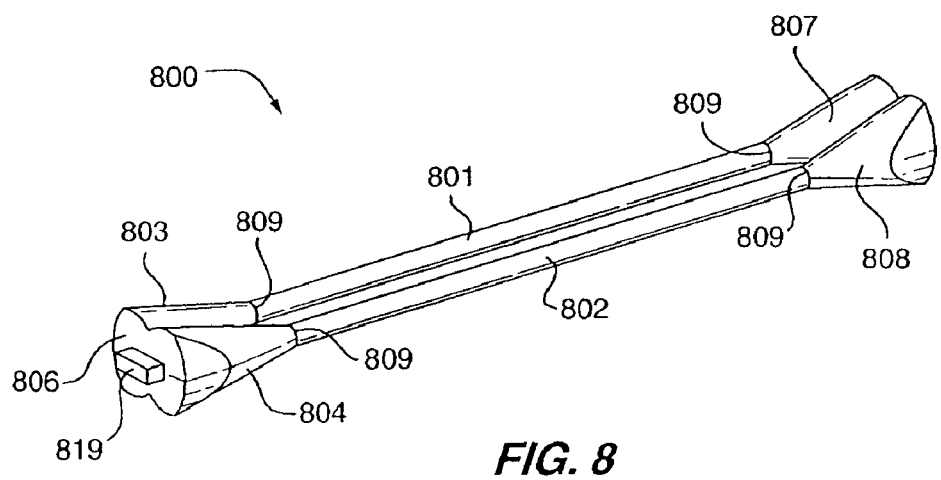
FIG. 8 discloses the flow path core formed by the core mold of FIG. 7.

Description of FIGS. 7 and 8

The first step in the injection molding process of the present invention is to fabricate a core mold which is used to form the flow path core required in the next step of the injection molding process. FIG. 7 discloses a core mold 700 having an upper half 701, a lower half 702 and vent holes 703 and 704 which are used to inject plastic into the cavity which is designated generally as 706. Cavity segment 706 includes flow path core cavity segments 706A, 706B, 706C, 706D, 706E, and 706F. Cavity segment 706 further includes manifold cavity segments 707 and 708 and core locating segments 719 and 720. The flow path core shown on FIG. 8 is formed by the core path mold 700 of FIG. 7 when the upper half 701 is lowered so that its bottom surface contacts the upper surface 709 of lower half 702. Following this, a low temperature fusible alloy is injected into one of holes 703 or 704 with the other being used as an air vent.

After the injected metal alloy solidifies, the two halves 701 and 702 of the mold are separated with the metal alloy within the cavity segments of FIG. 7 defining the flow path core of FIG. 8. These include flow path core segments 801 and 802 as well as manifold core segments 807, 808, 803, 804, 806 and 809. The core of FIG. 8 also includes locating protrusions 819 on the left and 820 on the right (not shown).

Figure 9:
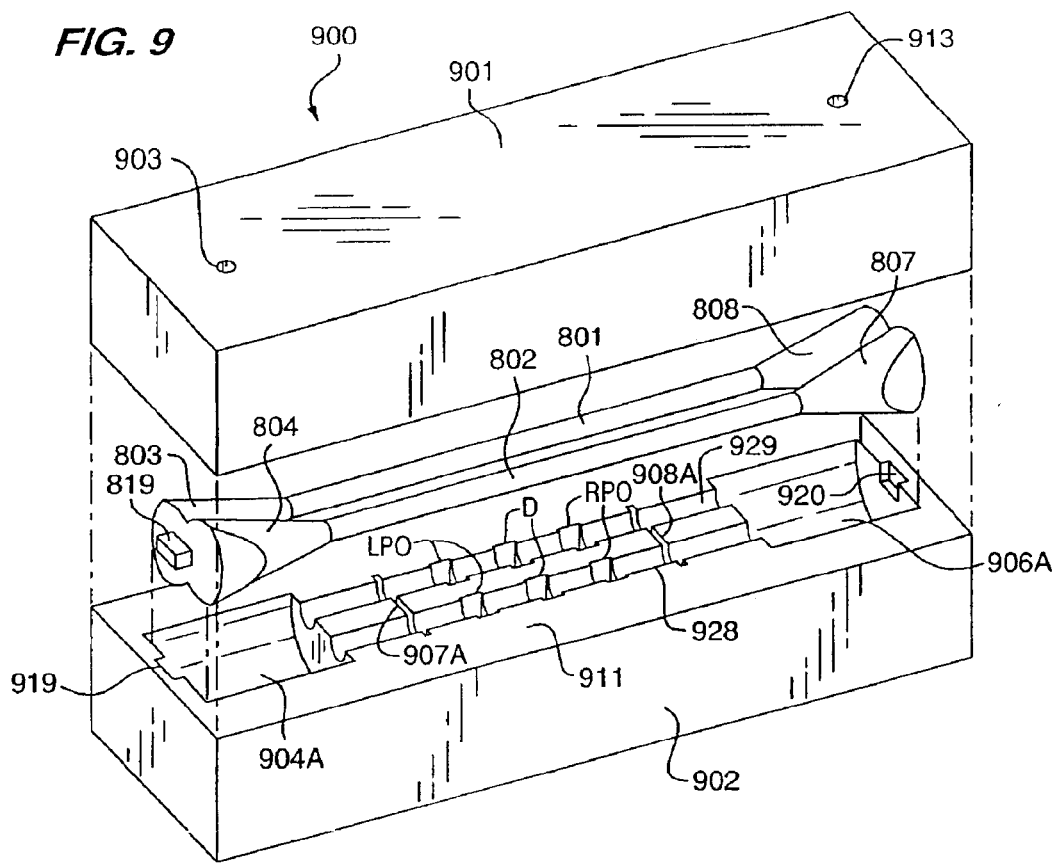
FIG. 9 discloses a wrapper mold and the flow path core prior to the flow path core being set into cavity segments of the wrapper mold.
Figure 10:
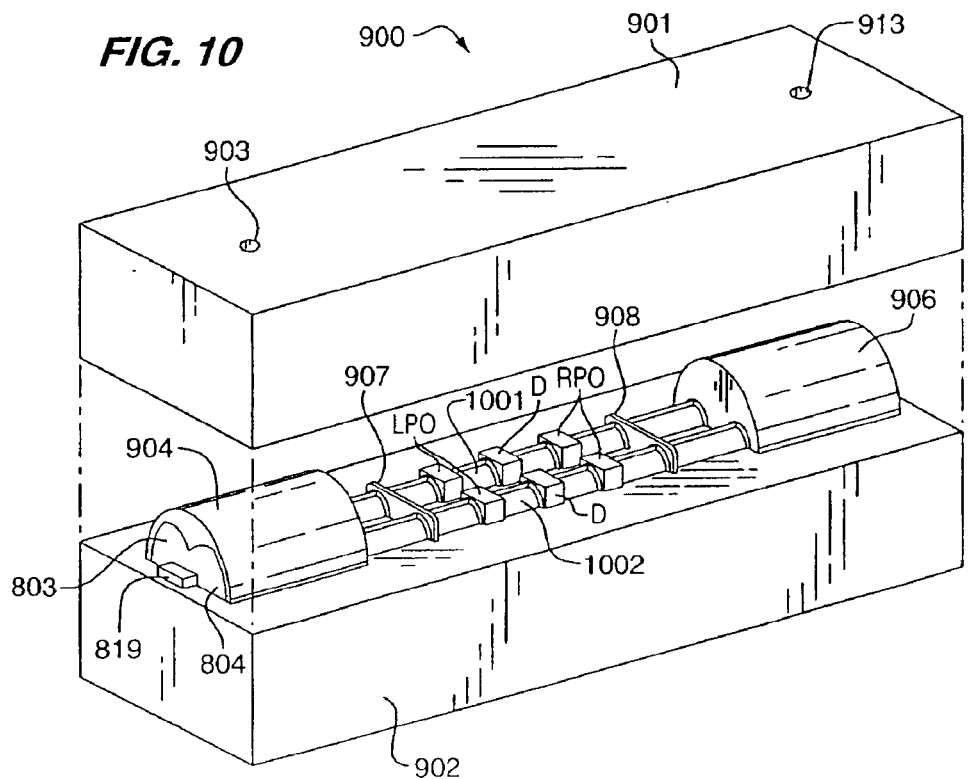
FIG. 10 discloses the Coriolis flow element structure formed by the wrapper mold of FIG. 9 following the completion of the molding process.
Figure 11:
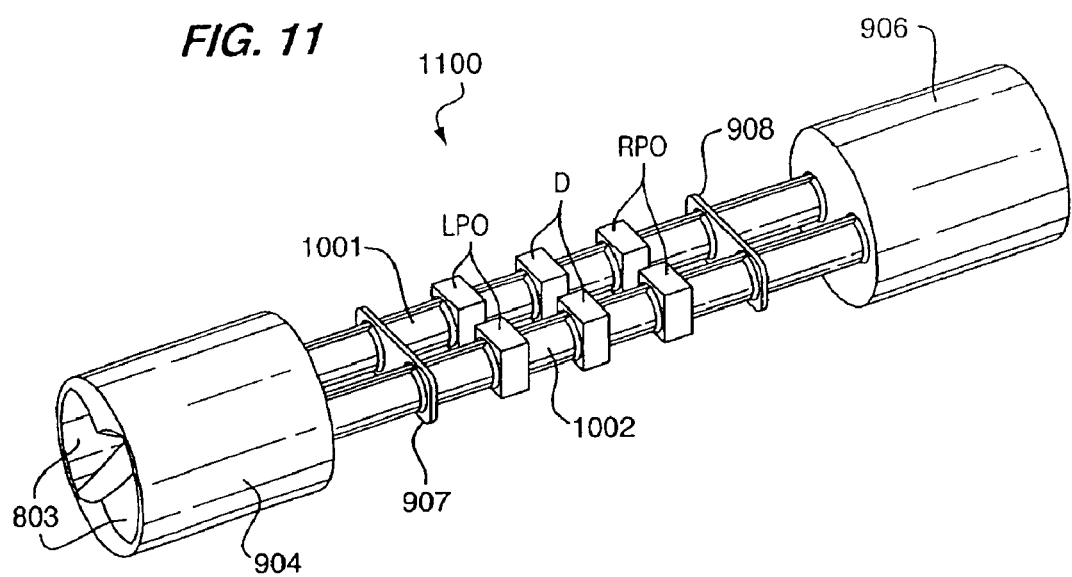
FIG. 11 discloses the flowmeter structure of FIG. 10 following its removal from the wrapper mold, and the removal by melting of the flow path core.

Description of FIGS. 9, 10 and 11

FIG. 9 discloses the wrapper mold which is used to fabricate a completed flowmeter using the flow path cores of FIG. 8.

On FIG. 9, wrapper mold 900 comprise an upper half 901, and a lower half 902 which are shown separated but which are joined during the injection molding process.

The process begins when the molded flow path core 800 of FIG. 8 is inserted into the cavity of lower half 902. This cavity on FIG. 9 has structure designated generally as 928 and 929 for the flow tube elements to be formed, and 904A and 906A for the manifolds of the flowmeter. The molded flow path core 800 shown on FIG. 8 is inserted into the cavity of the lower half 902. The rectangular protrusions 819 and 820 (not shown) on the core ends fit into rectangular cavity segments 919 and 920 in the mold to locate the flow path core within the cavity. The upper half 901 is then lowered so that it's bottom surface contacts the upper surface 911 of lower half 902 following which plastic is injected into either opening 903 or 913 of upper half 901 with the other opening being used as an air vent. The injected plastic flows into the cavity segments of the wrapper mold and surrounds the metallic flow path molded core within the cavity segments 928 and 929 of lower half 902. FIG. 9 shows cavity segments 907A and 908A for brace bars 907 and 908 and pick offs and drive brackets which are formed during this molding process.

After the plastic has time to cure and solidify, the upper and lower halves 901, 902 of mold 900 are separated and the partially completed Coriolis plastic flowmeter shown on FIG. 10 is then removed from the cavity segments of lower half 902.

Following its removal from the cavity of wrapper mold 900, the formed structure is heated to the level required to melt the metal flow path core 800 contained within the plastic structure. The metal melts, it flows out and leaves the flowmeter structure 1100 shown on FIG. 11 which includes two flow tubes 1001 and 1002, having hollow centers formerly occupied by the metal flow path core 800 shown on FIG. 8. The structure shown on FIG. 11 also includes input manifold 904 and output manifold 906 brace bars 907 and 908. Opening 803 of input manifold 904 receives a material flow into the input of the flowmeter and diverts this flow into two parts which are extended through flow tubes 1001 and 1002 to output manifold 906 which combines the two flows into a single material flow. Exit manifold 906 receives this dual flow and combines it into a single flow.

Figure 12:
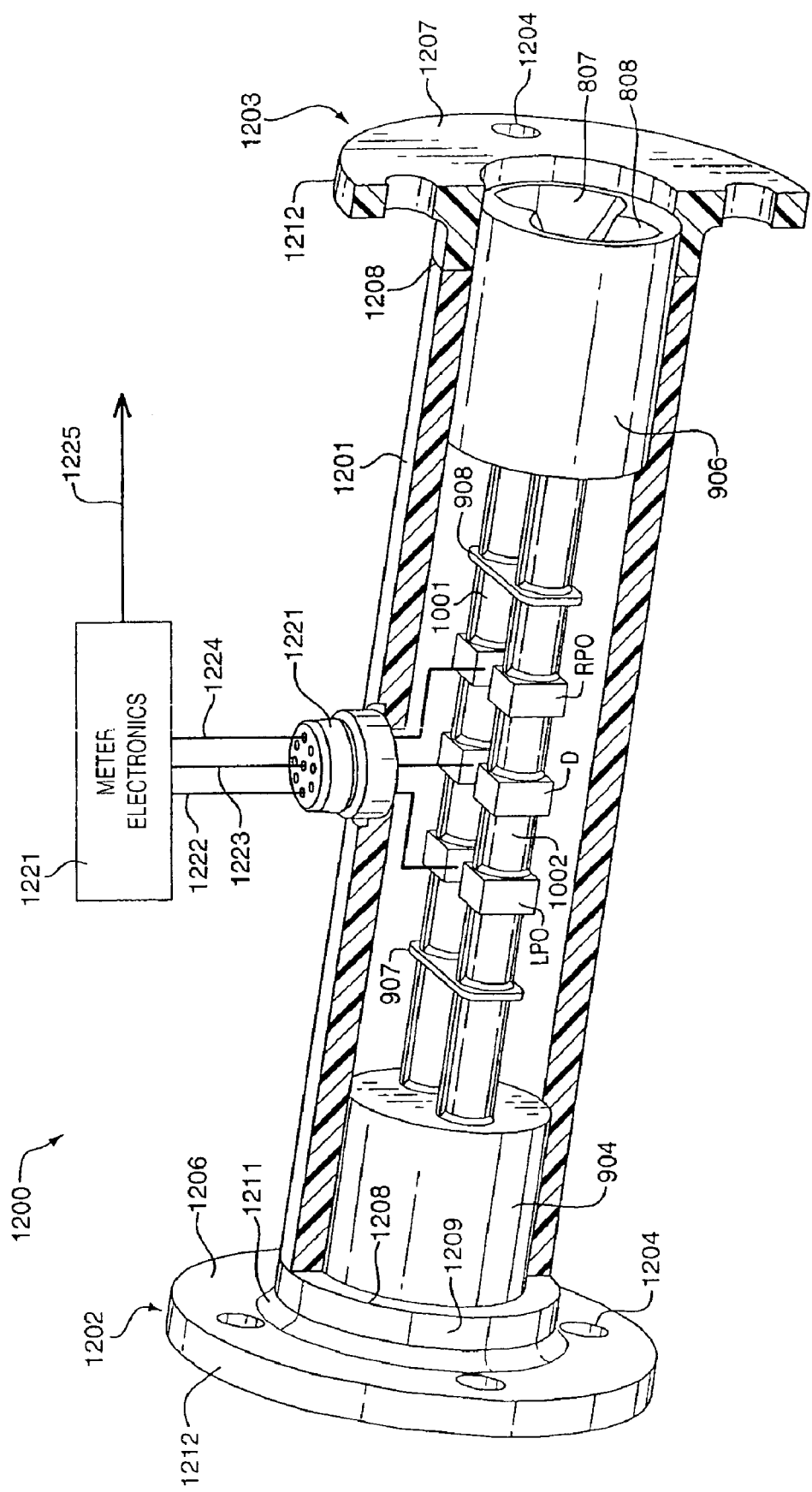
FIG. 12 discloses the flowmeter structure of FIG. 11 coupled to end flanges and an enclosing case.

Description of FIG. 12

FIG. 12 shows a completed Coriolis flowmeter 1200 formed by the injection molding process described for FIGS. 7, 8, 9,10, and 11. Flowmeter 1200 is assembled using the flowmeter structure 1100 of FIG. 11. Pick offs and driver are fastened to structure 1100 and wires 1222, 1223, and 1224 are connected from the pick offs and driver to electrical feed through 1221 in the case 1201. Case 1201 is then adhesive bonded to the exterior surfaces of manifolds 904 and 906. Following that, flanges 1202 and 1203 are adhesive bonded to the axial end portions of case 1201 as well as to the radial exterior cylindrical surfaces of manifolds 904 and 906.

Flanges 1202 and 1203 include elements 1212 which are the radial outer surfaces of each flange, an axial inner face 1206 and an axial outer face 1207, a beveled surface 1211, and a stub 1209 having an axially inner surface 1208 which is adhesively bonded to the outer axial extremities of case 1201.

Also shown on FIG. 12 is meter electronics 1221 which over conductor 1223 applied signals required to energize driver D to vibrate flow tubes 1001 and 1002 in phase opposition. Conductors 1222 and 1224 receive the signals from pick offs LPO and RPO representing the Coriolis forces induced in vibrating flow tubes 1001 and 1002 with material flow. Meter electronics receive these signals over conductors 1222 and 1224, processes the signals and applied output information to path 1225 pertaining to the material flow.

Figure 13:
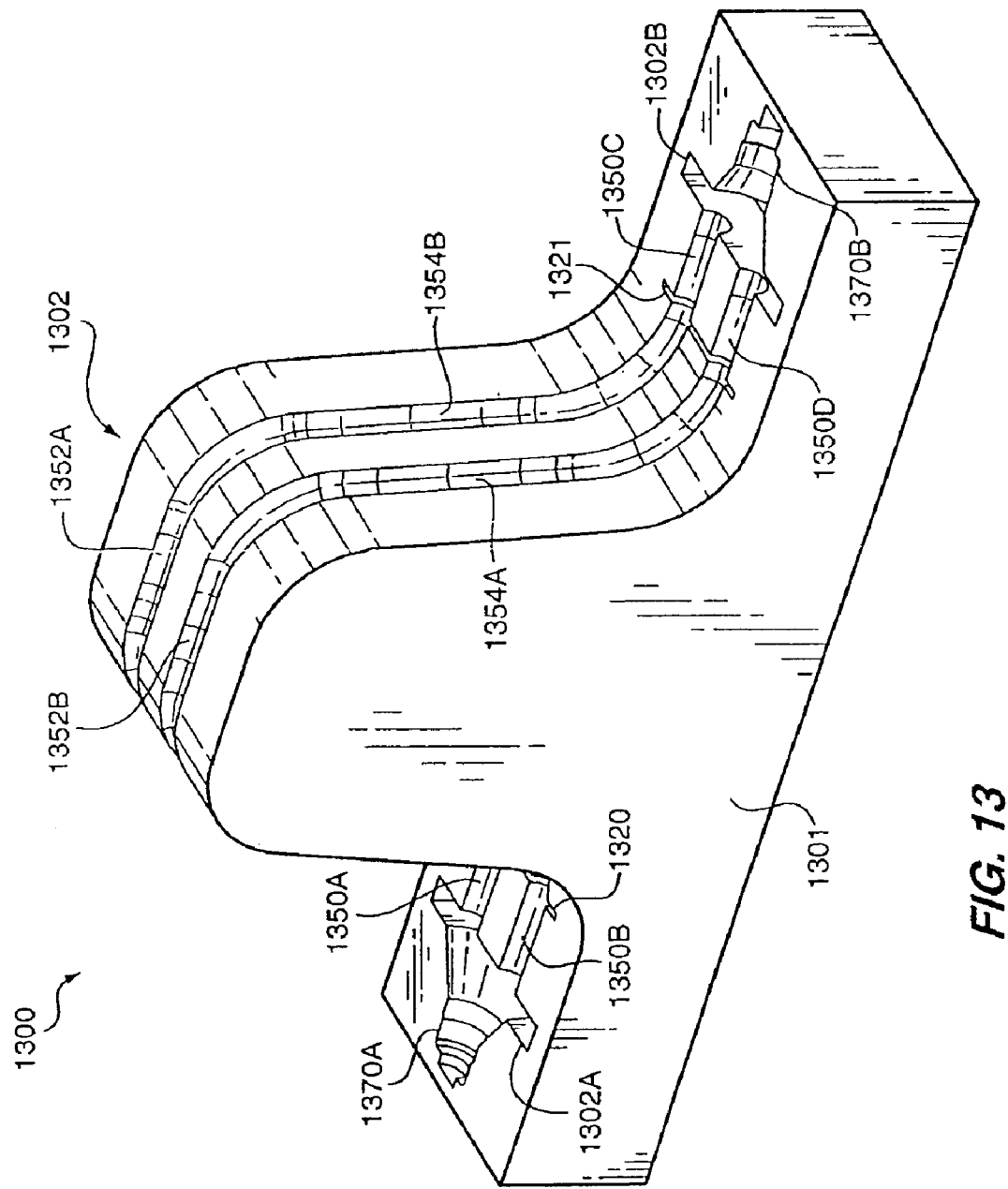
FIG. 13 discloses the bottom half of a wrapper mold used to form the flowmeter of FIG. 5 by a molding process.

Descriptions of FIG. 13

FIG. 13 discloses the lower portion 1301 of the wrapper mold 1300 used to fabricate the Coriolis flowmeter of FIG. 5 by injection molding to produce an all plastic flowmeter with the exception of metal conductors in driver D and pick offs LPO and RPO of FIG. 5. Wrapper mold 1300 includes a lower wrapper mold 1301 having cavity segments that define the exterior of the Coriolis flowmeter of FIG. 5. In order to facilitate an understanding of the correspondence between the elements on FIG. 5 and the cavity segments in the wrapper mold portion 1301, the last two digits of each reference number on the two drawings (excluding alphabetical characters) specifies the correspondence. Thus, flow tubes 552A and 552B on FIG. 5 are defined by cavity segments 1352A and 1352B on FIG. 13.

In describing the function of wrapper mold 1300, it is assumed that the flow path core has been formed as priorly described to form a metal structure representing the flow path of flow tubes 552A and 552B as well as the interior of the structural elements connected to the flow tubes such as flow path necks 570A and 570B. This formed flow path core is inserted into the cavity segments of the wrapper mold 1301.

The cavity segments on FIG. 13 include segments 1352A and 1352B which define a pair of substantially U-shaped flow tubes; cavity segments 1354A and 1354B which define the right side legs of the flow tubes; cavity segments 1320 and 1321 which define brace bars 520 and 521 of FIG. 5; cavity segments 1350A, B, C, and D which define flow channels 550A, B, C, and D of FIG. 5; cavity segments 1302A and 1302B which define manifolds 502A and 502B; and cavity segments 1370A and 1370B which define flow path necks 570A and 570B.

The flowmeter structure of FIG. 5 is formed when a flow path core of low melting temperature alloy is inserted into the cavity of mold segment 1302. Then a mating mold having cavity segments complementary to that of wrapper mold 1301 and having a recess for accommodating the center upwardly extending segment 1302 of wrapper mold 1301 is lowered onto wrapper mold 1301 to form an enclosed volume. The structure of FIG. 5 is formed when plastic is injected into the wrapper mold cavity segments. After the inserted and injected plastic has solidified the upper and lower portions of wrapper mold 1300 are separated and the formed structure is removed from the cavity segments of wrapper mold 1301. The flow path core is then removed by melting. The remaining structure is identical to that shown on FIG. 5 with the exception of flanges 501A and 501B. They are separately formed and affixed by adhesive bonding to the flow path necks 570A and 570B to form the completed all plastic flowmeter of FIG. 5.

Figure 14:
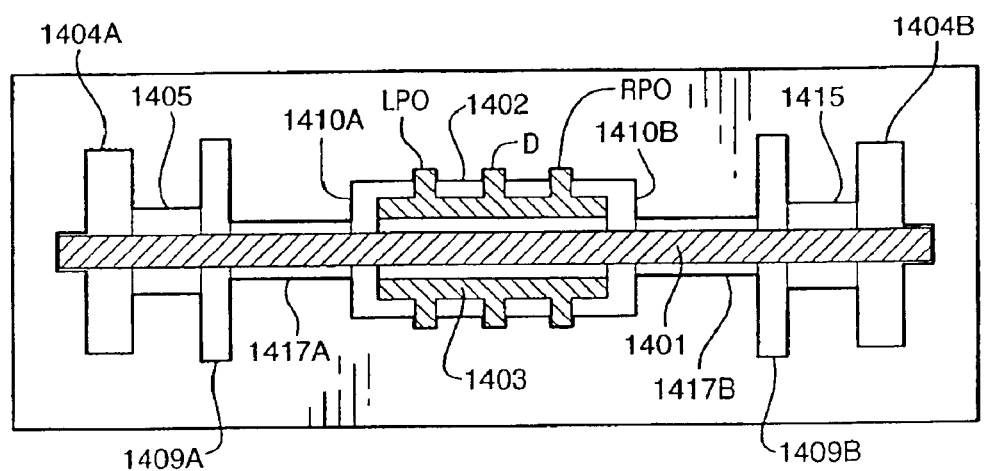
FIG. 14 discloses half of the wrapper mold used to form the flowmeter of FIG. 2 together with the sectioned flow path core as well as the sectioned balance bar core.

Description of FIG. 14

FIG. 14 discloses the details of a wrapper mold 1400 used to fabricate the single straight tube Coriolis flowmeter of FIG. 2. The cavity segments on FIG. 14 are identified by reference numbers whose last two digits (not including alphabetical characters) are identical to the last two digits of the parts of the flowmeter of FIG. 2 to which the cavity elements of FIG. 14 correspond.

Prior to the using wrapper mold 1400, a flow path core is formed by the priorly described techniques to define a metal element representing the flow path of flow tube 101 of FIG. 2. This core on FIG. 14 is the elongated cross hatched element 1401 extending the length of the cavity structure. Core 1401 extends the length of the flowmeter from cavity segment 1404A defining flange 104A of FIG. 2 to output flange cavity segment defining flange 104A on FIG. 2. The use of wrapper mold 1400 also requires that a core be previously formed representing the space between inner wall of balance bar 202 and exterior of flow tube 201 on FIG. 2. This balance bar core is the cross hatch area designated as element 1403. Cavity element 1402 represents the cavity segment that will be filled with plastic during the injection molding operation to define balance bar 202. Element 1403 includes upwardly projecting stubs LPO, D, and RPO to define openings in the balance bar 202 for receiving driver D, and pick offs LPO and RPO. The mating downwardly projecting stubs on cross hatch element 1402 are used to define openings in the bottom portion of balance bar 202. These openings are used during the manufacturing process to permit adjustments of the flow tube and balance bar for vibration control and tuning. They also locate the balance bar core in the wrapper mold cavity.

Elements 1417A and 1417B are the segments of the cavity segment that defines flow tube stubs 217A and 217B. Cavity segments 1410A and 1410B define brace bars 210A and 210B, cavity segments 1409A and 1409B define case ends 109A and 109B. Cavity segments 1405A and 1415B define necks 105 and 115 of FIG. 2 connecting the case ends to the flanges. Cavity segments 1404A and 1404B define flanges 104A and 104B.

The flowmeter of FIG. 2 is formed by wrapper mold 1400 by the steps of forming the flow path core 1401, forming the balance bar core 1403, inserting the balance bar core 1403 over the flow path core 1401, positioning cores 1401 and 1403 within the cavity segments of the wrapper mold 1400 on FIG. 14, lowering the other half (not shown) of wrapper mold 1400 onto the lower half shown on FIG. 14, injecting plastic into the cavity segments of the wrapper mold of FIG. 14, allowing the injected plastic to cure and solidify, separating the two halves of the wrapper mold 1400, removing the formed solidified plastic material which then has a physical appearance of the Coriolis flowmeter of FIG. 2 with the exception of the meter electronics and conductors and driver D and pick offs LPO and RPO. The formed structure is then heated a sufficient amount to melt the core material which flows out of the interior of the formed structure leaving a completed all plastic flowmeter identical to that of FIG. 2 with the exception of the necessary metal elements including the conductors of the coils of driver D and the pick offs LPO and RPO as well as the conductors extending to meter electronics 121.

Figure 15:
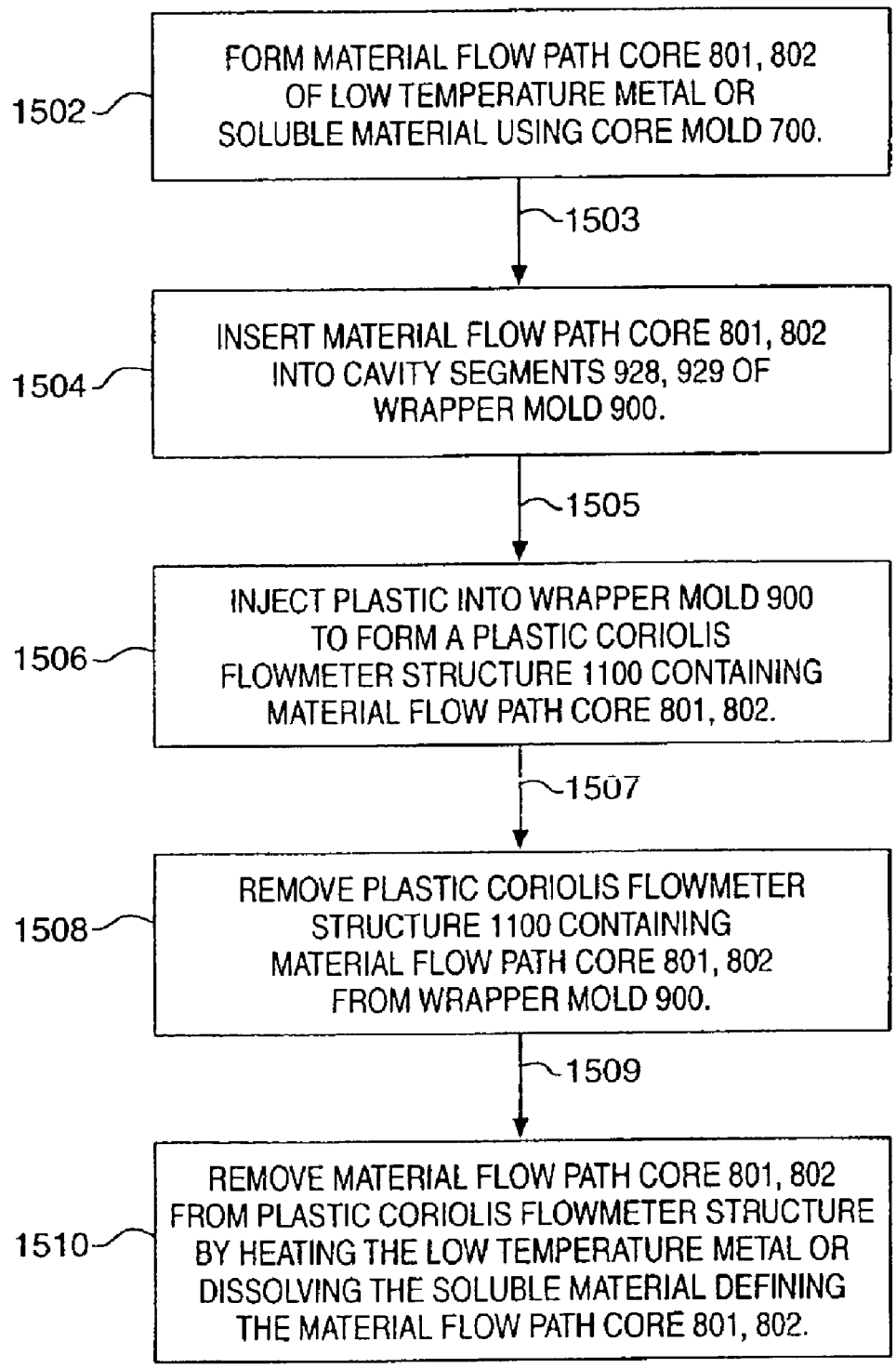
FIGS. 15, 16, 17 are flow charts of the methods used to fabricate the Coriolis flowmeters embodying the invention.

Description of FIG. 15

FIG. 15 is a flow chart illustrating the method used to form the dual straight tube Coriolis flowmeter shown in FIG. 12 using the molding apparatus and structures shown on FIGS. 7, 8, 9, 10, and 11.

Step 1502 on FIG. 15 begins the process and includes the step of forming the material flow path cores 801 and 802 of low temperature metal or soluble material using core mold 700. FIG. 8 shows the core molds 801 and 802 formed by injection molding using core mold 700 including its upper half 701 and its lower half 702.

In step 1504, the formed material flow path cores 801 and 802 are removed from the core mold 700 and placed in the cavity segments, including cavity segments 928, 929 and 904A and 906A of wrapper mold 900 having an upper half 901 and a lower half 902. The protrusions 818 and a corresponding protrusion (not shown) on the right end of cores 801 and 802 facilitates the accurate placing of cores 801 and 802 in the cavity segments of wrapper mold 900. Wrapper mold 900 also includes cavity segments 907A, 908A, LPO, RPO, and D for forming brace bars, 907, 908, and mounting elements for driver D and pick offs LPO and RPO.

In step 1506, the two halves 901 and 902 of the wrapper mold 900 are closed and plastic is injected into the cavities of wrapper mold 900 to form a plastic Coriolis flowmeter structure 1100 containing the material flow path cores 801 and 802 and other structures including manifolds 904 and 906 shown on FIG. 11.

In step 1508, the formed Coriolis flowmeter plastic structure 1100 containing the material flow path cores 801 and 802 is removed from wrapper mold 900.

In step 1510 the plastic Coriolis flowmeter structure i100 is heated to dissolve the low temperature metal cores 801 and 802 or is subjected to heated water to dissolve the soluble material defining the material flow path cores 801 and 802.

The plastic Coriolis flowmeter structure 1100 is then subject to further manufacturing steps in order to form a completed flowmeter as shown in FIG. 12.

Figure 16:
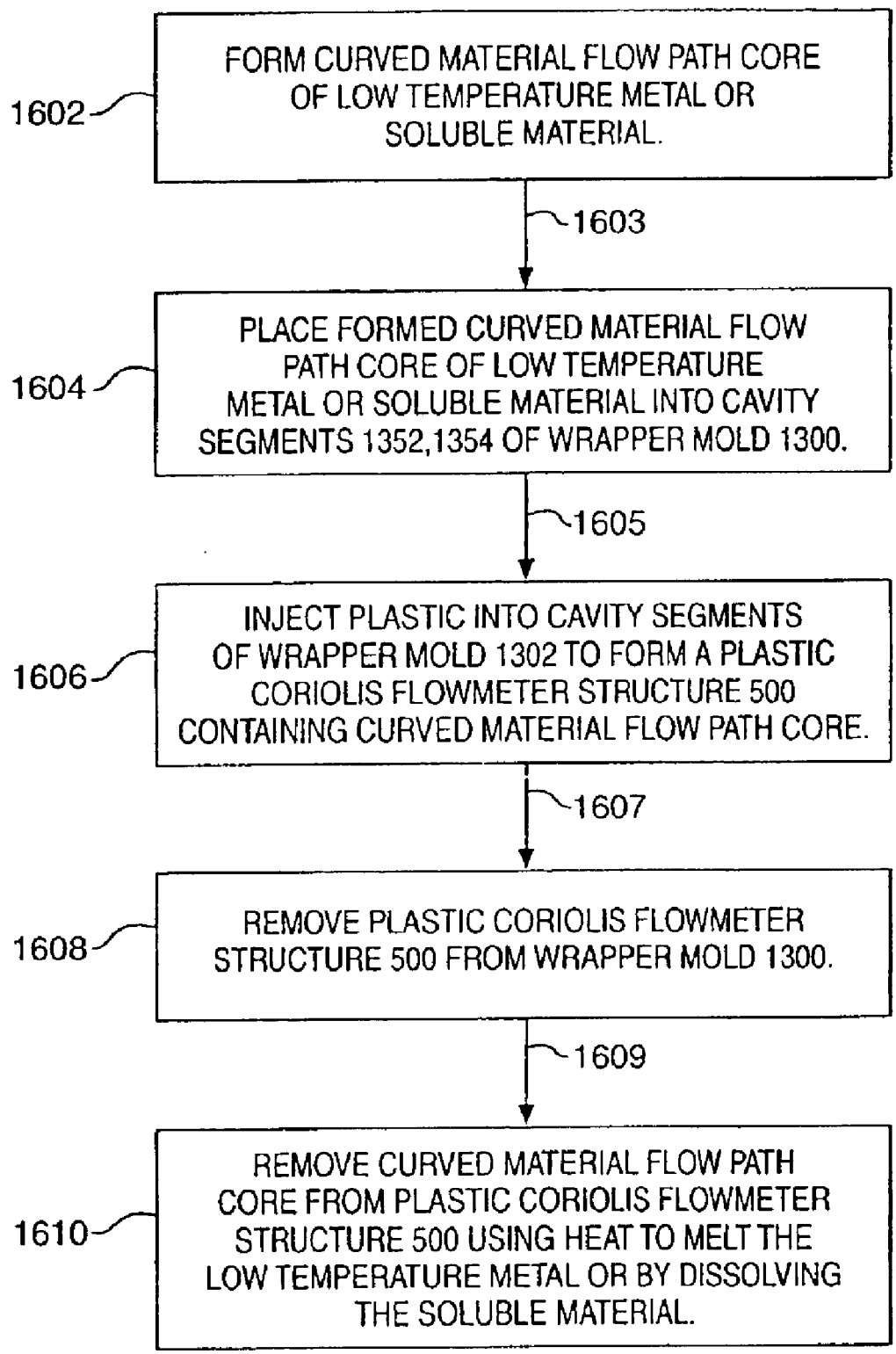

Description of FIG. 16

FIG. 16 discloses the process steps used to form the dual curved tube Coriolis flowmeter 500 of FIG. 5 using wrapper mold 1300 shown on FIG. 13.

Step 1602 begins this process and includes the step of forming a pair of curved material flow path cores of low temperature metal or soluble material. These cores are not shown on FIG. 13 but are formed using a core mold similar to that of FIG. 7 but of a curved configuration with the formed material flow path cores being curved but otherwise comparable to material flow path cores 801 and 802 of FIG. 8.

In step 1604 the formed curved material flow path cores (not shown) are inserted into cavity segments 1352 and 1354 of the lower portion 1301 of wrapper mold 1300. This mold further includes cavity segments 1320 and 1321 defining brace bars, 1350 defining flow tube extensions, 1302 defining input and output manifolds and 1370 defining neck elements for flanges 501 of FIG. 5 which are subsequently added.

In step 1606, the top portion of (not shown) of wrapper mold 1300 is positioned onto the lower portion 1301 and plastic is injected into the cavity segments of the wrapper mold to form the plastic Coriolis flowmeter structure 500 of FIG. 5 containing the curved material flow path cores (not shown) on FIG. 13.

In step 1608, the formed plastic Coriolis flowmeter structure 500 is removed from the lower portion 1301 of wrapper mold 1300.

In step 1610, the material flow path cores are removed from the plastic Coriolis flowmeter structure 500 using heat to melt the low temperature metal or by dissolving the soluble material representing the cores by immersing the plastic Coriolis flowmeter structure 500 in hot water.

Figure 17:
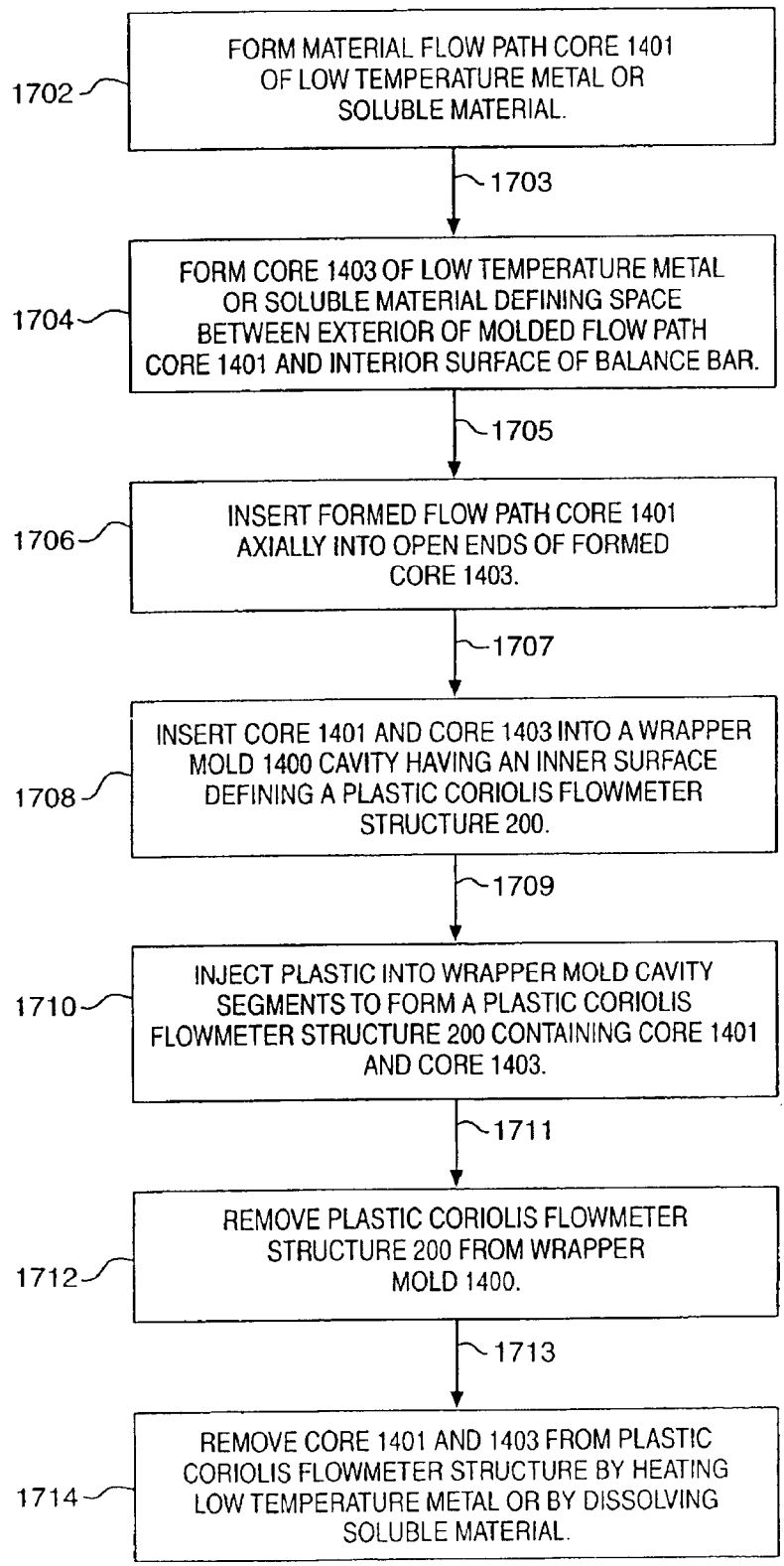

Description of FIG. 17

FIG. 17 illustrates the process steps used to form the single straight tube Coriolis flowmeter 200 using the wrapper mold of FIG. 14.

The process begins with step 1702 in which the material flow path core 1401 is formed of low temperature metal or soluble material using a core mold similar to that of core mold 700 but not otherwise shown.

In step 1704, core 1403 is formed defining the space between the exterior of the molded full flow path core 1401 and the inner surface of balance bar 202.

In step 1706, the flow path core 1401 is inserted axially into the open end of core 1403.

In step 1708, cores 1401 and 1403 are inserted into the cavity of wrapper mold 1400 with the cavity having an inner surface defining the plastic Coriolis flowmeter structure 200.

In step 1710, plastic is injected into the cavities of wrapper mold 1400 which contains the cores 1401 and 1403.

In step 1712, the formed plastic Coriolis structure 200 is removed from wrapper mold 1400.

In step 1714, cores 1401 and 1403 are removed from the formed plastic Coriolis flowmeter structure 200 by heating the low temperature metal comprising the cores or by dissolving the soluble material comprising the cores using hot water.

It is to be understood that the present invention is not limited to the described embodiment; but that it may be used with other types of Coriolis flowmeters including single tube flowmeters of irregular or curved configuration. For example, it has been described how a Coriolis plastic flowmeter can be formed by the use of injection molding. If desired, the entirety of the described Coriolis flowmeters can be formed by a single injection molding operation. Alternatively, an all plastic flowmeter can be formed by separate injection molding or other forming operations in which parts are formed separately and later joined together by means of adhesive bonding. This is particularly true for certain embodiments in which it may be desirable to form the case as a separate element which is later bonded to elements priorly formed by injection bonding. Alternatively, in some applications it may be desirable to form the case of metal rather than plastic for applications in which increased physical protection of the dynamically active portions of the flowmeter is desired. In this case, the metal case can be separately formed and applied by appropriate bonding techniques to the remaining portions of the flowmeter which may be priorly formed by appropriate injection molding techniques. It is to be understood that the use of the term plastic flowmeter does not include certain elements which of necessity must be formed of metal. These include the coils of the drivers and pick offs and the electrical conductors extending to the associated meter electronics and drive and pick off magnets.

The low temperature alloy may be a cerro-indium alloy termed Cerrolow 117 that may be purchased from McMaster—Carr Supply Company whose address is P.O. Box 4355, Chicago, Ill. 60680-4355. The term "plastic" as used herein means any of various nonmetallic compounds, synthetically produced (usually from organic compounds by polymerization) which can be molded into various forms and hardened for commercial use. This plastic has an elastic modulus, as low as 20,000 psi for pure and as high as 2,000,000 for glass filled in the plastic.

The soluble material referred to herein may be a soluble wax available from Dussek/Yates Investment Casting Wax Inc. whose address is;

1815-t w. 15th. Street

Chicago, Ill. 60608

Phone 312 666 9850

Fax 312 666 7502

This soluble wax may be dissolved by placing the plastic Coriolis flowmeter structure containing the soluble wax core in hot water.

What is claimed is:

1. A method of fabricating structure of a Coriolis flowmeter including flow tube means; said method comprising the steps of:

forming a core defining a material flow path of said flow tube means by injecting a low melting point metal into a cavity of a core mold with said cavity defining said material flow path;

placing said formed material flow path core into a cavity of a wrapper mold and closing said wrapper mold to form a cavity between the outer surface of said formed material flow path core and the interior surface of said cavity of said wrapper mold;

said cavity of said wrapper mold defines the outer surface of said flow tube means;

filling said cavity of said wrapper mold with plastic to form a molded plastic flow tube means that contains said formed material flow path core;

removing said molded plastic flow tube means containing said formed material flow path core from said wrapper mold; and removing said formed material flow path core from said molded plastic flow tube means by raising the temperature of said molded plastic flow tube means above the melting temperature of the low melting point metal forming said material flow path core.

2. The method of claim 1 characterized in that said cavity further has means that locates said formed material flow path core in said cavity of said wrapper mold.

3. The method of claim 1 further including the step of forming said core mold having said cavity that defines said material flow path of said flow tube means.

4. The method of claim 3 further including the step of forming a wrapper mold having a cavity that defines said outer surface of said flow tube means and further having said means that locates said formed material flow path core in said cavity of said wrapper mold.

5. The method of claim 4 characterized in that said flow tube means defines a pair of flow tubes;

the step of forming said core mold includes the step of forming said core mold so that said cavity of said core mold defines the material flow paths of said pair of flow tubes;

the step of forming said material flow path core includes the step of forming said material flow path core of said pair of flow tubes;

the step of filing said cavity of said wrapper mold with plastic includes the step of forming a molded plastic structure defining said pair of flow tubes each containing one of said material flow path cores.

6. The method of claim 5 characterized in that said fabricated Coriolis flowmeter structure further comprises:

a first brace bar coupling a first end of each of said pair of flow tubes to each other and a second brace bar coupling a second end of each of said flow tubes to each other;

characterized in that said step of forming a wrapper mold includes the step of forming a cavity in said wrapper mold that defines the outer surface of said fabricated Coriolis flowmeter structure including said first and second brace bars and said pair of flow tubes;

the step of filing said cavity of said wrapper mold with plastic includes the step of forming a plastic Coriolis flowmeter structure defining said pair of flow tubes and said brace bars and with said formed Coriolis flowmeter structure containing said formed material flow path core.

7. The method of claim 6 characterized in that said fabricated Coriolis flowmeter structure further comprises:

driver mounting elements and pick off mounting elements affixed to said first and second flow tubes;

said step of forming said wrapper mold includes the step of forming a cavity in said wrapper mold that defines the outer surface of said fabricated Coriolis flowmeter structure including said driver mounting elements and said pick off mounting elements;

characterized in that said wrapper mold has provisions for locating said formed core in said cavity of said wrapper mold;

characterized in that the step of filing said cavity of said wrapper mold with plastic includes the step of forming a molded plastic Coriolis flowmeter structure that contains said pair of flow tubes, said driver mounting element and said pick off mounting elements with said pair of flow tubes containing said formed material flow paths core.

8. The method of claim 7 characterized in that said fabricated flowmeter structure further comprises:

an inlet flange coupled to an inlet end of said flow tubes and an outlet flange coupled to an outlet end of said flow tubes;

characterized in that said step of forming a wrapper mold includes the step of forming having a cavity that defines the outer surface of said Coriolis flowmeter structure including said flow tubes, said first brace bar and said second brace bar, said inlet flange and said outlet flange;

the step of filing said cavity of said wrapper mold with plastic includes the step of forming a molded plastic Coriolis flowmeter structure that that defines the exterior surface of said flow tubes, said first and second brace bars and said inlet flange and said outlet flange with said plastic Coriolis flowmeter structure containing said formed material flow path core.

9. The method of claim 8 characterized in that said fabricated flowmeter structure further comprises:

an inlet manifold coupling said inlet flange to an inlet end of said flow tubes and an outlet manifold coupling said outlet flange to an outlet end of said flow tubes;

said step of forming a wrapper mold includes the step of forming having a cavity that defines the outer surface of said Coriolis flowmeter structure including said flow tubes, said first brace bar and said second brace bar, said inlet manifold and said outlet manifold, said inlet flange and said outlet flange;

the step of filing said cavity of said wrapper mold with plastic includes the step of forming a molded plastic Coriolis flowmeter structure that that defines the exterior surface of said flow tubes, said first and second brace bars and said inlet manifold and said outlet manifold, said inlet flange and said outlet flange with said plastic Coriolis flowmeter structure containing said formed flow path core.

10. A method of fabricating a Coriolis flowmeter having:

flow tube means adapted to receive a material flow from a flowmeter inlet and to extend said material flow through said flow tube means to a flowmeter outlet;

a driver for vibrating said flow tube means;

pick off means coupled to said flow tube means for generating output signals representing Coriolis deflections of said vibrating flow tube means with material flow;

meter electronics responsive to said output signals generated by said pick off means for generating output information pertaining to said material flow; and said flow tube means being formed of plastic to define a plastic wetted material flow path that extends through the entirety of the length of said flow tube means;

said wetted material flow path further includes plastic flow tube means stubs each having a first end connected to ends of said flow tube means;

a first one of said plastic flow tube means stubs has a second end adapted to receive said material flow;

a second one of said plastic flow tube stubs has a second end adapted to discharge said material flow;

said method of fabricating comprising the steps of:

forming a core defining said material flow path by injecting soluble material into a cavity of a core mold with said cavity defining said material flow path;

placing said formed material flow path core into a cavity of a wrapper mold and closing said wrapper mold to form a cavity between the outer surface of said formed material flow path core and the interior surface of said cavity of said wrapper mold;

said cavity of said wrapper mold defines the outer surface of said flow tube means;

filling said cavity of said wrapper mold with plastic to form a molded plastic flow tube means that contains said formed material flow path core;

removing said molded plastic flow tube means containing said formed material flow path core from said wrapper mold; and removing said formed material flow path core from said molded plastic flow tube means by dissolving said molded formed material flow path core with a solvent.

* * * * *

UNITED STATES PATENT AND TRADEMARK OFFICE
CERTIFICATE OF CORRECTION

| | | |
|---|---|---|
| PATENT NO. | : 6,904,667 B2 | Page 1 of 1 |
| APPLICATION NO. | : 10/156984 | |
| DATED | : June 14, 2005 | |
| INVENTOR(S) | : Gregory Treat Lanham and Anthony Pankratz | |

It is certified that error appears in the above-identified patent and that said Letters Patent is hereby corrected as shown below:

Column 18, line 20, replace "i100" with --1100--.

Signed and Sealed this

Fourth Day of December, 2007

JON W. DUDAS
*Director of the United States Patent and Trademark Office*